US009372601B2

(12) United States Patent
Miyazaki

(10) Patent No.: US 9,372,601 B2
(45) Date of Patent: Jun. 21, 2016

(54) INFORMATION PROCESSING APPARATUS, INFORMATION PROCESSING METHOD, AND PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 414 days.

(21) Appl. No.: 13/533,185

(22) Filed: Jun. 26, 2012

(65) Prior Publication Data

US 2013/0024775 A1    Jan. 24, 2013

(30) Foreign Application Priority Data

Jul. 22, 2011    (JP) .................................. 2011-160608

(51) Int. Cl.
  *G06F 3/048*    (2013.01)
  *G06F 3/0484*    (2013.01)
(52) U.S. Cl.
  CPC .......... *G06F 3/0484* (2013.01); *G06F 3/04842* (2013.01); *G06F 3/04845* (2013.01)
(58) Field of Classification Search
  CPC   G06F 3/04842; G06F 3/04845; G06F 3/0484

USPC ........................................ 348/14.14; 715/733
See application file for complete search history.

(56) References Cited

U.S. PATENT DOCUMENTS

| 5,894,305 A * | 4/1999 | Needham ....................... 715/733 |
| 2004/0165768 A1* | 8/2004 | Zhang et al. ................... 382/162 |
| 2008/0313546 A1* | 12/2008 | Nykamp ......................... 715/738 |
| 2011/0126105 A1* | 5/2011 | Isozu ................... G06F 17/3082 715/720 |
| 2011/0193932 A1* | 8/2011 | Long et al. .................. 348/14.07 |

FOREIGN PATENT DOCUMENTS

JP    2011-108146    6/2011

* cited by examiner

*Primary Examiner* — Jennifer To
*Assistant Examiner* — John Repsher, III
(74) *Attorney, Agent, or Firm* — Chip Law Group

(57) ABSTRACT

An information processing apparatus that controls a user interface to display content, acquires position information corresponding to an input received at the user interface, determines a condition corresponding to the position information, and controls the user interface to display data corresponding to the input based on a result of the determining.

15 Claims, 24 Drawing Sheets

FIG. 9
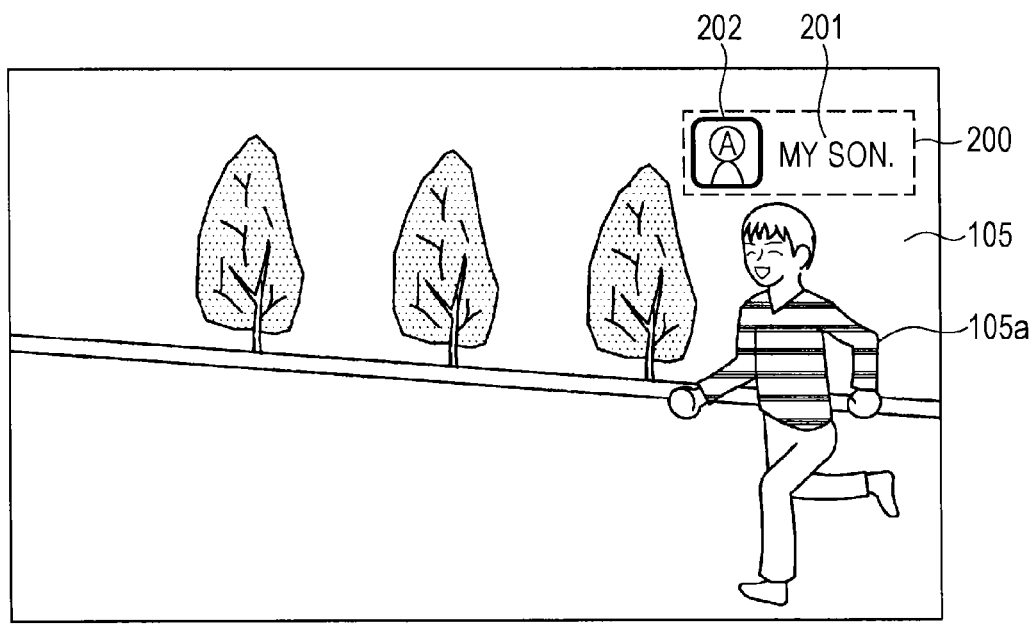
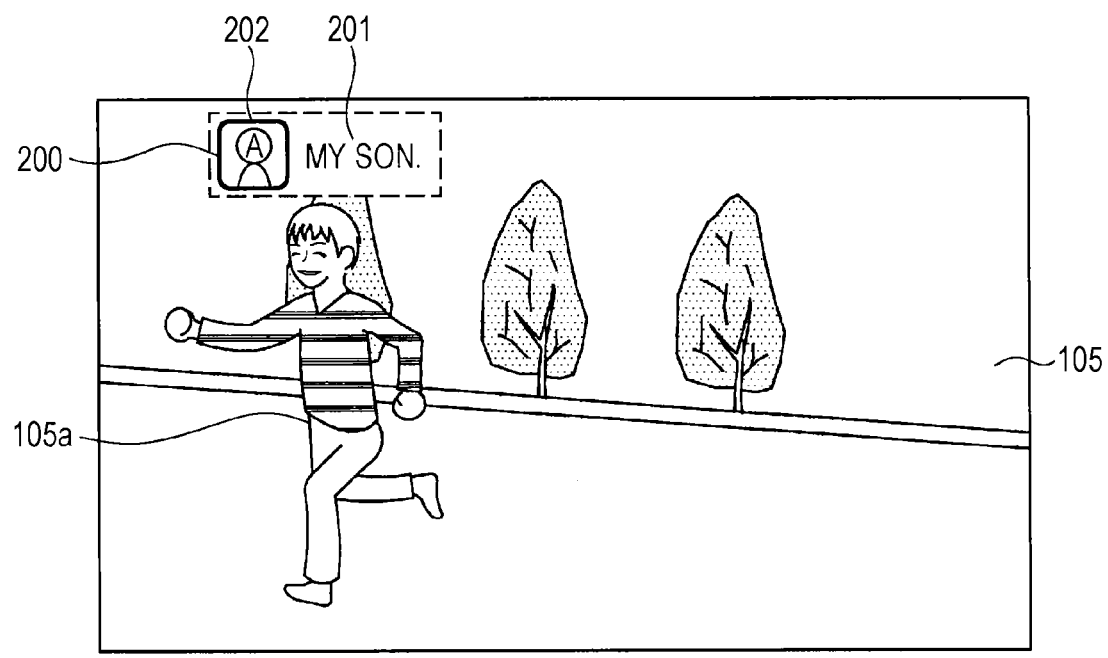

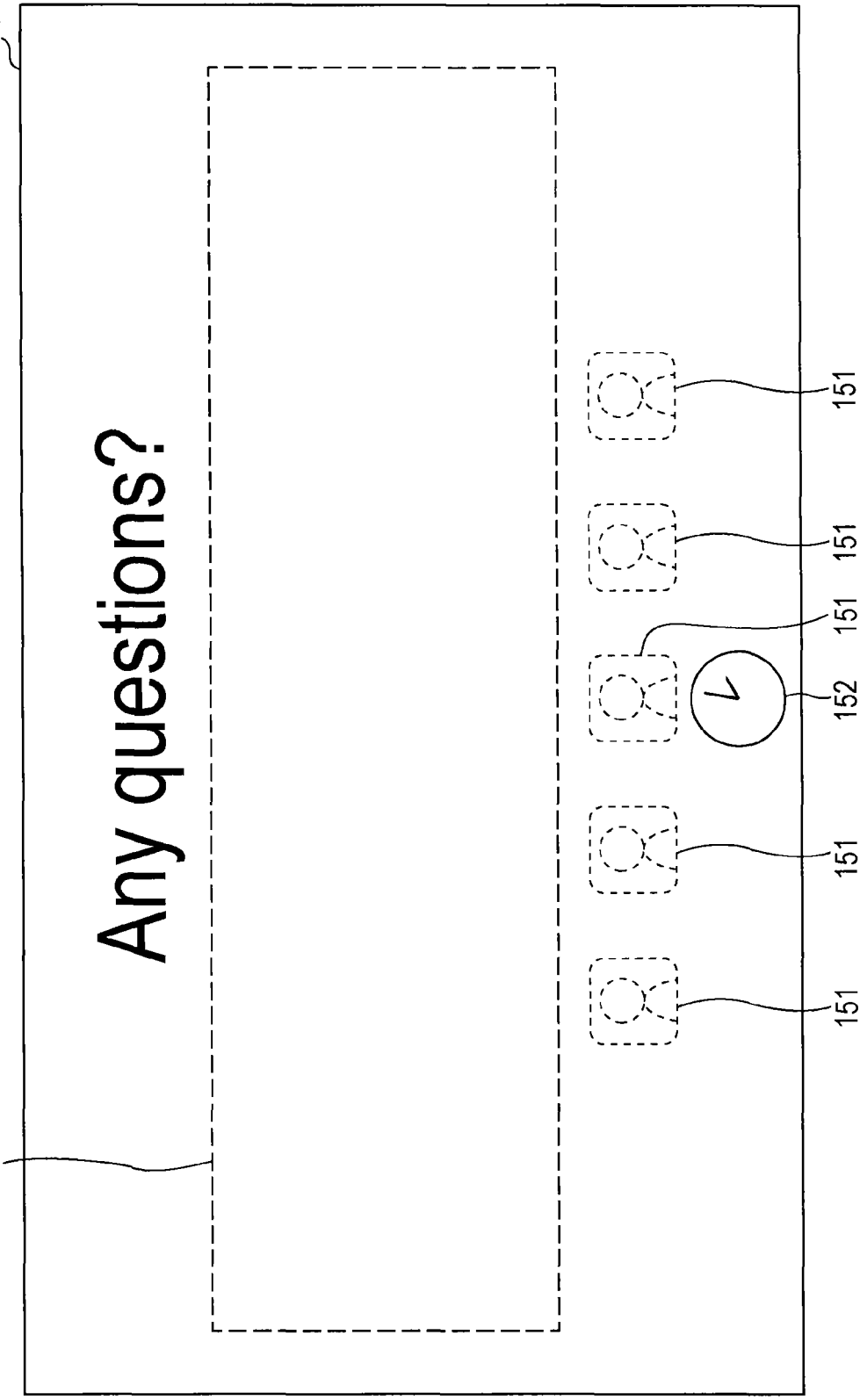

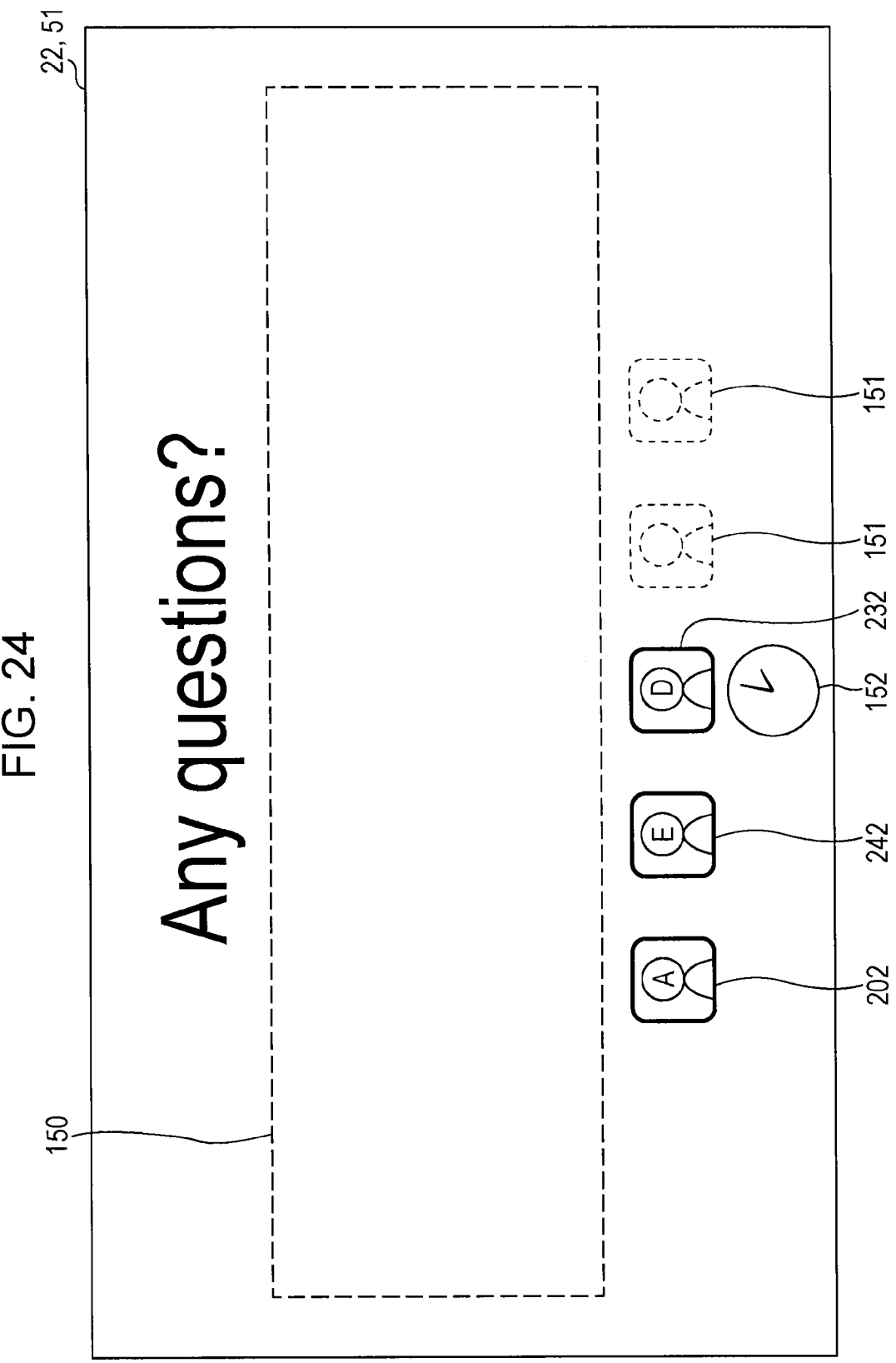

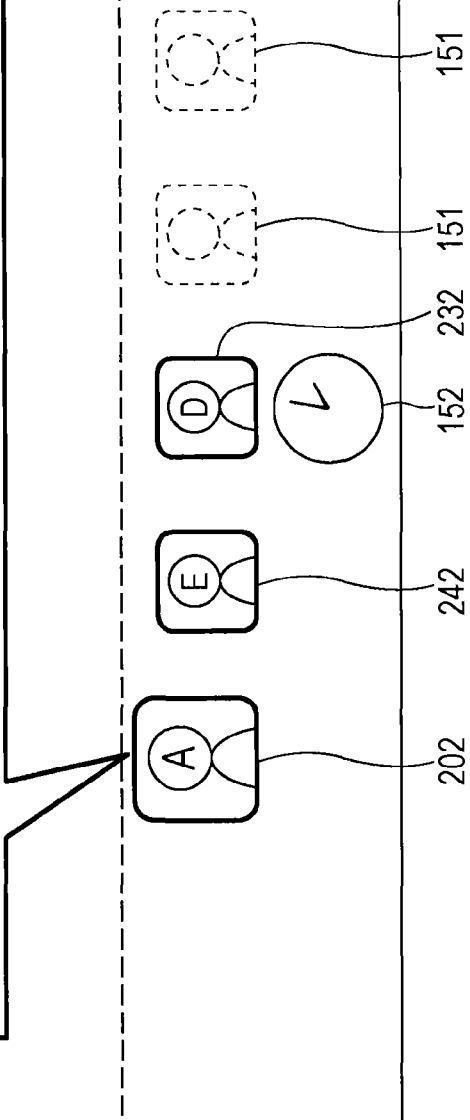

INFORMATION PROCESSING APPARATUS, INFORMATION PROCESSING METHOD, AND PROGRAM

CROSS REFERENCE TO RELATED APPLICATION

This application claims the benefit of priority under 35 U.S.C. §119 to Japanese Priority Patent Application JP 2011-160608 filed in the Japan Patent Office on Jun. 8, 2011, the entire contents of which are hereby incorporated by reference.

BACKGROUND

The present disclosure relates to an information processing apparatus, an information processing method, and a program.

For example, an information processing system disclosed in Japanese Unexamined Patent Application Publication No. 2011-108146 is capable of distributing a same content to individual communication devices in real time. Accordingly, each of the communication devices can display the same content in real time.

SUMMARY

However, among contents in display on each of the communication devices, the above-described information processing system is not allowed to superimpose another content, at a position requested by a user, on a content in display on each of the communication devices.

According to an embodiment of the present disclosure, there is provided an information processing apparatus including a processor that controls a user interface to display content; acquires position information corresponding to an input received at the user interface; determines a condition corresponding to the position information; and controls the user interface to display data corresponding to the input based on a result of the determining.

According to another embodiment of the present disclosure, there is provided an information processing method performed by an information processing apparatus, the method comprising: controlling a user interface to display content; acquiring position information corresponding to an input received at the user interface; determining a condition corresponding to the position information; and controlling the user interface to display data corresponding to the input based on a result of the determining.

According to another embodiment of the present disclosure, there is provided a non-transitory computer-readable medium including computer program instructions, which when executed by an information processing apparatus, cause the information processing apparatus to perform a method comprising: controlling a user interface to display content; acquiring position information corresponding to an input received at the user interface; determining a condition corresponding to the position information; and controlling the user interface to display data corresponding to the input based on a result of the determining.

BRIEF DESCRIPTION OF THE DRAWINGS

FIG. 9 is an explanatory diagram illustrating an example of a content displayed on a presentation section of a communication device;

FIG. 23 is an explanatory diagram illustrating an example of a content displayed on a screen;

FIG. 24 is an explanatory diagram illustrating an example of a content displayed on a screen; and FIG. 25 is an explanatory diagram illustrating an example of a content displayed on a screen.

DETAILED DESCRIPTION OF EMBODIMENTS

Figure 1:
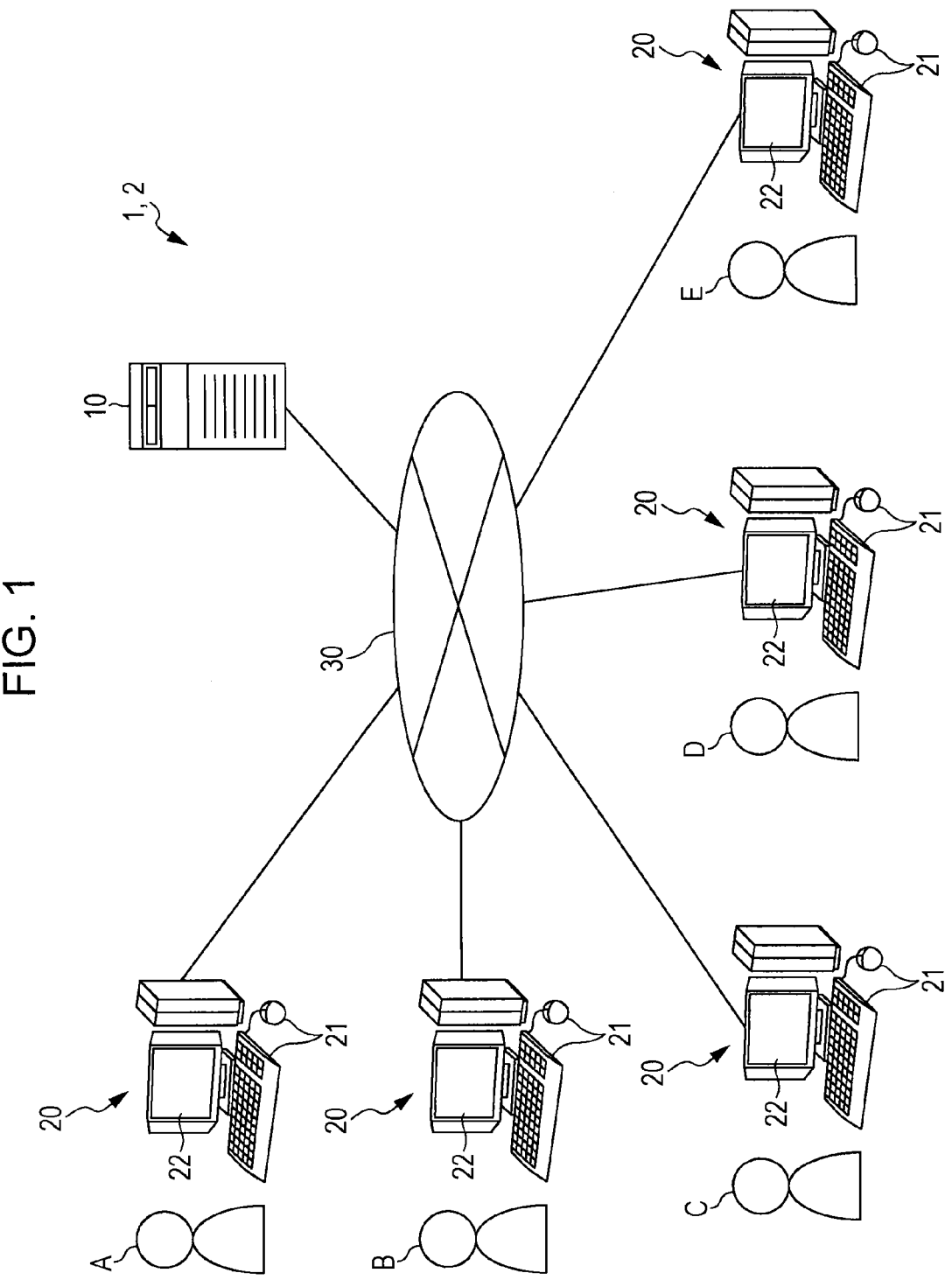
FIG. 1 is an explanatory diagram illustrating a configuration of an information processing system according to a first embodiment of the present disclosure.

In the following, detailed descriptions will be given of preferred embodiments of the present disclosure with reference to the attached drawings.

In this regard, in this specification and the drawings, a same reference numeral is given to a component having a substantially same functional configuration, and thus a duplicated description will be omitted.

In this regard, the descriptions will be given in the following order.

1. First embodiment (an example of superimposing (combining) a superimposed display content at a position requested by user on reference content)
  1.1 Overall configuration
  1.2 Configuration of server
  1.3 Configuration of communication device
  1.4 Processing procedure by information processing system
2. Second embodiment (example of user voting)
  2.1 Overall configuration
  2.2 Processing procedure by information processing system
3. Third embodiment (example of displaying combined content of reference content and superimposed display content on a display)
  3.1 Overall configuration
  3.2 Processing procedure by information processing system
4. Fourth embodiment (example of displaying superimposed display content in a show window)
  4.1 Overall configuration
  4.2 Processing procedure by information processing system
5. Fifth embodiment (example of displaying combined content at the time of presentation)
  5.1 Overall configuration
  5.2 Processing procedure by information processing system 1. First Embodiment 1.1 Overall Configuration First, a description will be given of an overall configuration of an information processing system 1 according to a first embodiment with reference to FIG. 1. The information processing system 1 includes a server (information processing apparatus) 10, a plurality of communication devices (user terminals) 20, and a communication network 30.

The server 10 is connected to each of a plurality of the communication devices 20 through the communication network 30. The server 10 can transmit (distribute) a reference content to each of the communication devices 20. Here, the reference content includes all image contents that are visible to a user. The reference content can be considered to be, for example, a television program, a movie, an animation, a blog, a home page, a photo content, an album (a set of photo contents), one scene of a moving image, an illustration, a cooking recipe, an electronic book, an advertisement, etc. Here, a blog in the present embodiment is assumed to include a short blog, and a mini blog. The reference content may be a combination of an image content and an audio content.

Also, a reference content is a concept that includes not only the above-described image content, but also an actual object (for example, an object displayed on a show window). In this regard, if a reference content is an object, the server 10 transmits not an actual reference content, but an image content (for example, a photo content) on which the reference content is drawn to each of the communication devices 20.

Also, the server 10 obtains a user content and position information from each of the communication devices 20. Here, the user content includes all the contents visible to the user in the same manner as the reference content. The position information indicates a position on the reference content. And the server 10 superimposes (combines) the user content at a position indicated by the position information on the reference content. Thereby, the server 10 generates a combined content produced by superimposing a user content on the reference content. The server 10 transmits the generated combined content to each of the communication devices 20.

Each of the communication devices 20 is a so-called desktop computer, and is connected to the server 10 and the other communication devices 20 through the communication network 30. Each of the individual communication devices 20 is operated by a corresponding one of different users A to E. In the following, a word "user" represents one of the users A to E unless otherwise specifically described.

The communication device 20 includes a presentation section 22, and can display a reference content transmitted from the server 10 on the presentation section 22. Also, the communication device 20 is capable of transmitting position information of a position on the reference content, specified by the user, and a user content selected by the user to the server 10. The communication device 20 can display the combined content from the server 10 in response to this on the presentation section 22. In this regard, the communication device 20 can be connected to the communication network 30. And the communication device 20 may be any device as far as the device can display an image content, and may be for example, a notebook-sized personal computer, a game machine, a smart phone, a mobile phone, etc.

In this regard, the information processing system 10 includes five communication devices and one server in FIG. 1, but a number of individual components is not limited to this.

1.2 Configuration of Server

Figure 2:
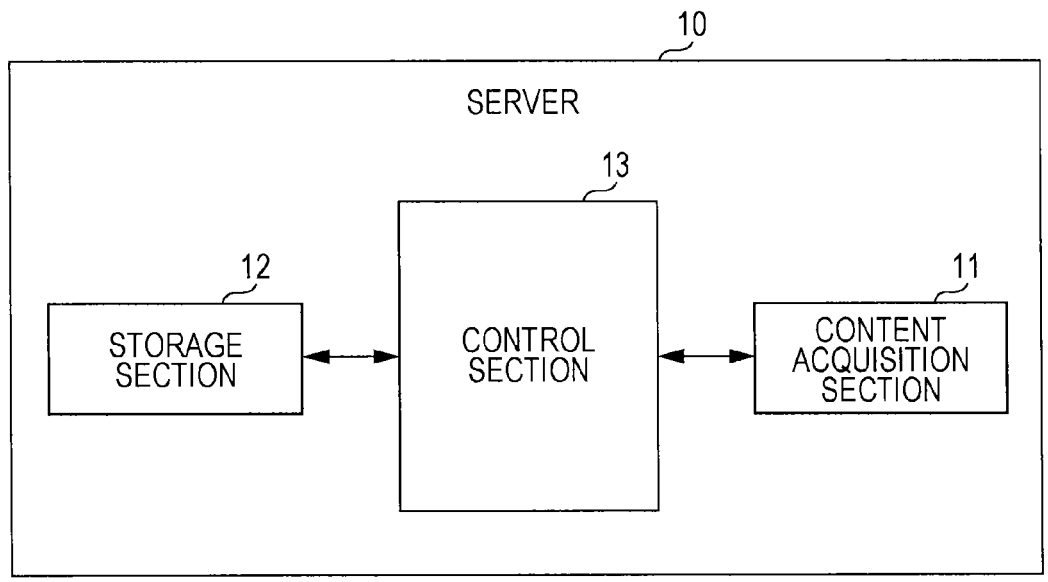
FIG. 2 is a block diagram illustrating a configuration of a server according to the first embodiment.

Next, a description will be given of a configuration of the server 10 with reference to FIG. 1 and FIG. 2. As shown in FIG. 2, the server 10 includes a content acquisition section 11, a storage section 12, and a control section 13. That is to say, the server 10 has a hardware configuration, such as a CPU, a ROM, a RAM, a hard disk, a communication antenna, etc., and the above-described components are achieved by the hardware configuration.

The content acquisition section 11 transmits a reference content given from the control section 13 to each of the communication devices 20. Also, the content acquisition section 11 outputs a user content and position information, which have been transmitted from each of the communication devices 20, to the control section 13.

The storage section 12 stores various kinds of information that is necessary for processing by the server 10, for example, programs and various kinds of reference contents, etc. The control section 13 controls individual components of the server 10. Also, the control section 13 generates a superimposed display content on the basis of a user content given from the content acquisition section 11. The superimposed display content may be a user content itself, and also may be an altered user content. If a user content includes a short sentence content, such as a short blog, etc., and a user-face icon image, a superimposed display content becomes a combination of a short sentence content and a user-face icon image, or a balloon image including a short sentence content and a user-face icon image that are disposed in the image, etc.

1.3 Configuration of Communication Device

Figure 3:
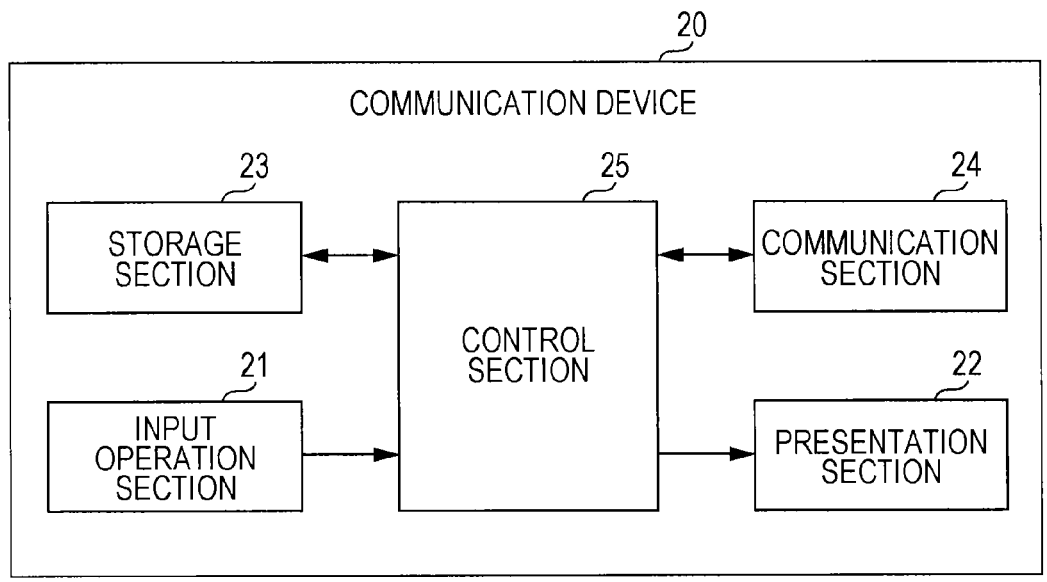
FIG. 3 is a block diagram illustrating a configuration of a communication device according to the first embodiment.

Next, a description will be given of a configuration of the communication device 20 with reference to FIG. 1 and FIG. 3. As shown in FIG. 3, the communication device 20 includes an input operation section 21, a presentation section 22, a storage section 23, a communication section 24, and a control section 25. That is to say, the communication device 20 has a hardware configuration including a CPU, a ROM, a RAM, a mouse, a keyboard, a display, a communication antenna, etc., and achieves the above-described components by the hardware configuration.

The input operation section 21 is a so-called keyboard and mouse, and outputs operation information in response to input operation of the user to the control section 25. The user can input a user content and position information using the input operation section 21. The presentation section 22 is a so-called display. The presentation section 22 displays various image contents, and outputs various audio contents.

The storage section 23 stores various kinds of information that is necessary for the communication device 20 to execute various kinds of processing, for example, programs, and various image contents, etc. The image contents stored in the storage section 24 include user-face icon images. The user-face icon images are used as user information. The communication section 24 performs communication with the server 10 and the other communication devices 20. The control section 25 controls each component in the communication device 20. Also, the control section 25 outputs the user content input by the user and position information to the communication section 24. The communication section 24 transmits the user content and the position information to the server 10.

1.4 Processing Procedure by Information Processing System

Figure 4:
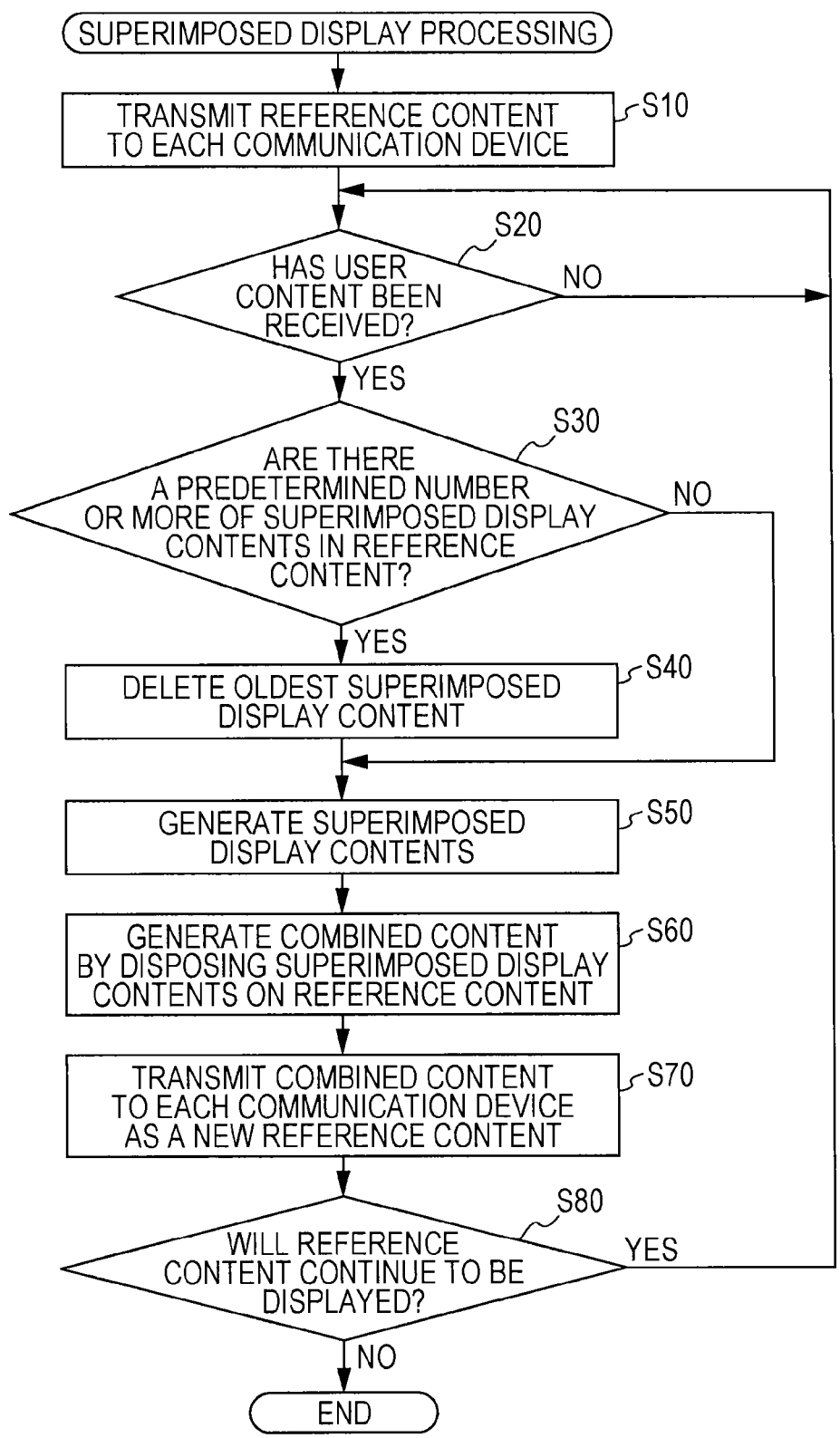
FIG. 4 is a flowchart illustrating a processing procedure by the information processing system.

Next, a description will be given of a processing procedure by the information processing system 1 with reference to a flowchart illustrated in FIG. 4. The information processing system 1 performs superimposed display processing illustrated in FIG. 4. In step S10, the control section 13 of the server 10 obtains a reference content from the storage section 12, and outputs the reference content to the content acquisition section 11. The content acquisition section 11 transmits the reference content to each of the communication devices 20. The communication section 24 of each of the communication devices 20 receives the reference content, and transmits the reference content to the control section 25. The control section 25 displays the reference content and an image content stored in the storage section 23 on the presentation section 22. In this regard, the control section 25 may obtain various image contents from the Internet, and may display the image contents together with the reference content on the presentation section 22. In this regard, the reference content may have some relationship with these image contents.

Figure 5:
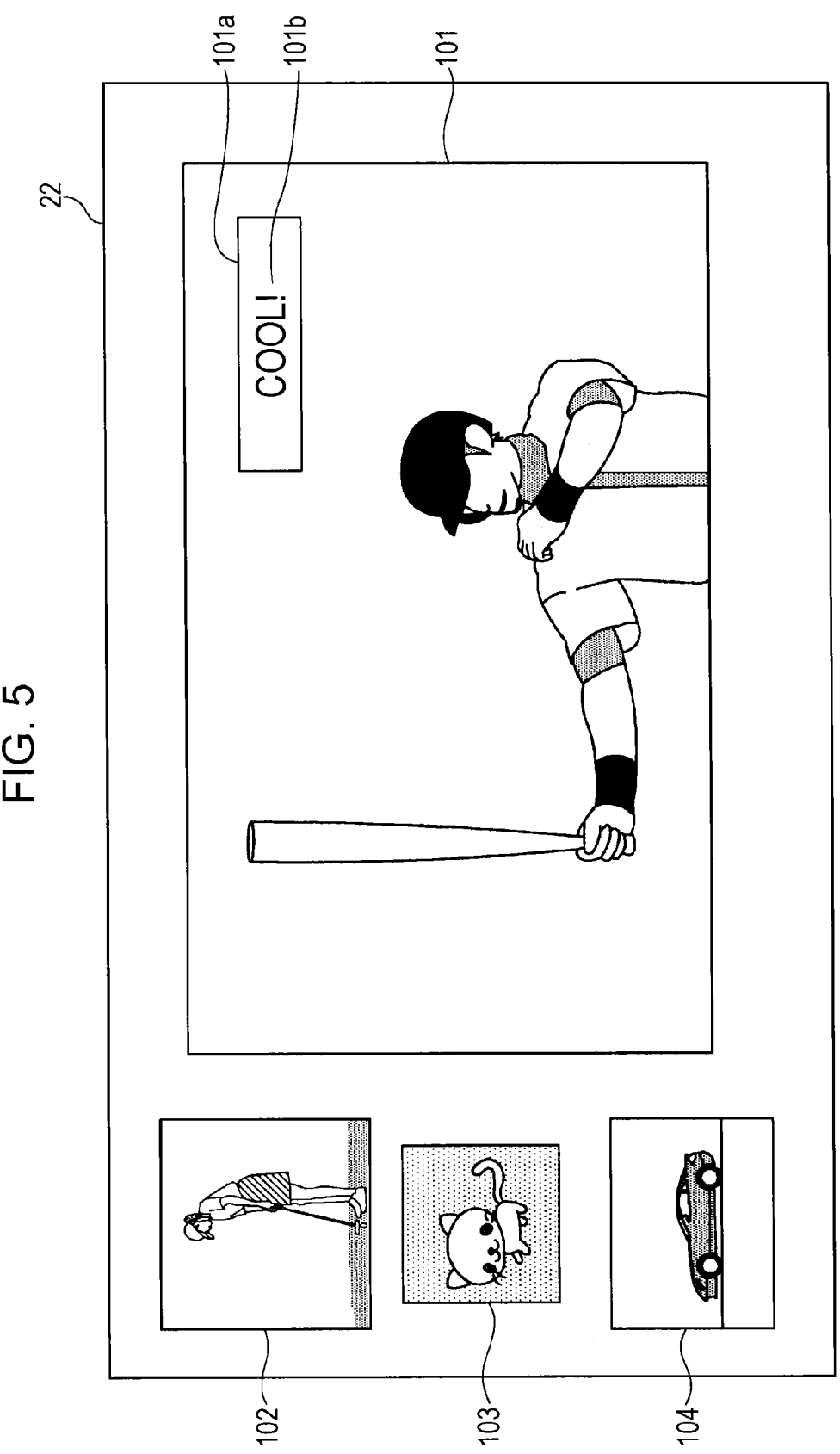
FIG. 5 is an explanatory diagram illustrating an example of a content displayed on a presentation section of a communication device.

FIG. 5 illustrates a display example. In this example, the presentation section 22 displays a reference content 101, and displays image contents 102 to 104 as image contents other than the reference content 101.

The user can superimpose a short-sentence content at a requested position on the reference content 101 as a user content. Here, a description will be given of a method of superimposing a short sentence content on a reference content with reference to FIG. 5. The user moves a mouse pointer P (refer to FIG. 6) to a requested position on the reference content 101, and performs determination operation (for example, a left click on the mouse) there. The control section 25 recognizes the position of the mouse pointer P as a display position of the user content, that is to say, a user-specified position. The control section 25 displays a short-sentence-content input frame image 101a at a position of the mouse pointer P on the presentation section 22. The user inputs a requested short sentence content 101b in the short-sentence-content input frame image 101a. The control section 25 determines the short sentence content and the face icon image of the user to be a user content, and outputs the user content and position information indicating the user-specified position to the communication section 24. The communication section 24 transmits superimposed-display request information including this information to the server 10. The content acquisition section 11 of the server 10 receives the superimposed-display request information, and outputs the information to the control section 13.

In step S20, the control section 13 waits until the user content, that is to say, the superimposed-display request information is given. If the superimposed-display request information is given, the control section 13 proceeds to step S30.

In step S30, the control section 13 determines whether a condition that there are a predetermined number or more of superimposed display contents in the reference content is met or not. Here, the superimposed display content is a content produced, for example, by combining a user-face icon image and a short sentence content. If determined that this condition is met, the control section 13 proceeds to step S40. If determined that this condition is not met, the control section 13 proceeds to step S50.

In step S40, the control section 13 erases (deletes) an oldest superimposed display content from the reference content. In step S50, the control section 13 combines the short sentence content and the face icon image to generate a superimposed display content. In step S60, the control section 13 superimposes the superimposed display content at the user-specified position on the reference content. Thereby, the control section 13 generates the combined content. On this combined content, for example, a center point of a face-icon image portion is disposed at the user-specified position among the superimposed display contents.

In step S70, the control section 13 outputs a combined content to the content acquisition section 11 as a new reference content, and stores the combined content into the storage section 12. The content acquisition section 11 transmits the reference content to each of the communication devices 20. A communication section 24 of each of the communication devices 20 receives the reference content, and transmits the reference content to the control section 25. The control section 25 replaces the reference content in display by the reference content given from the communication section 24.

Figure 6:
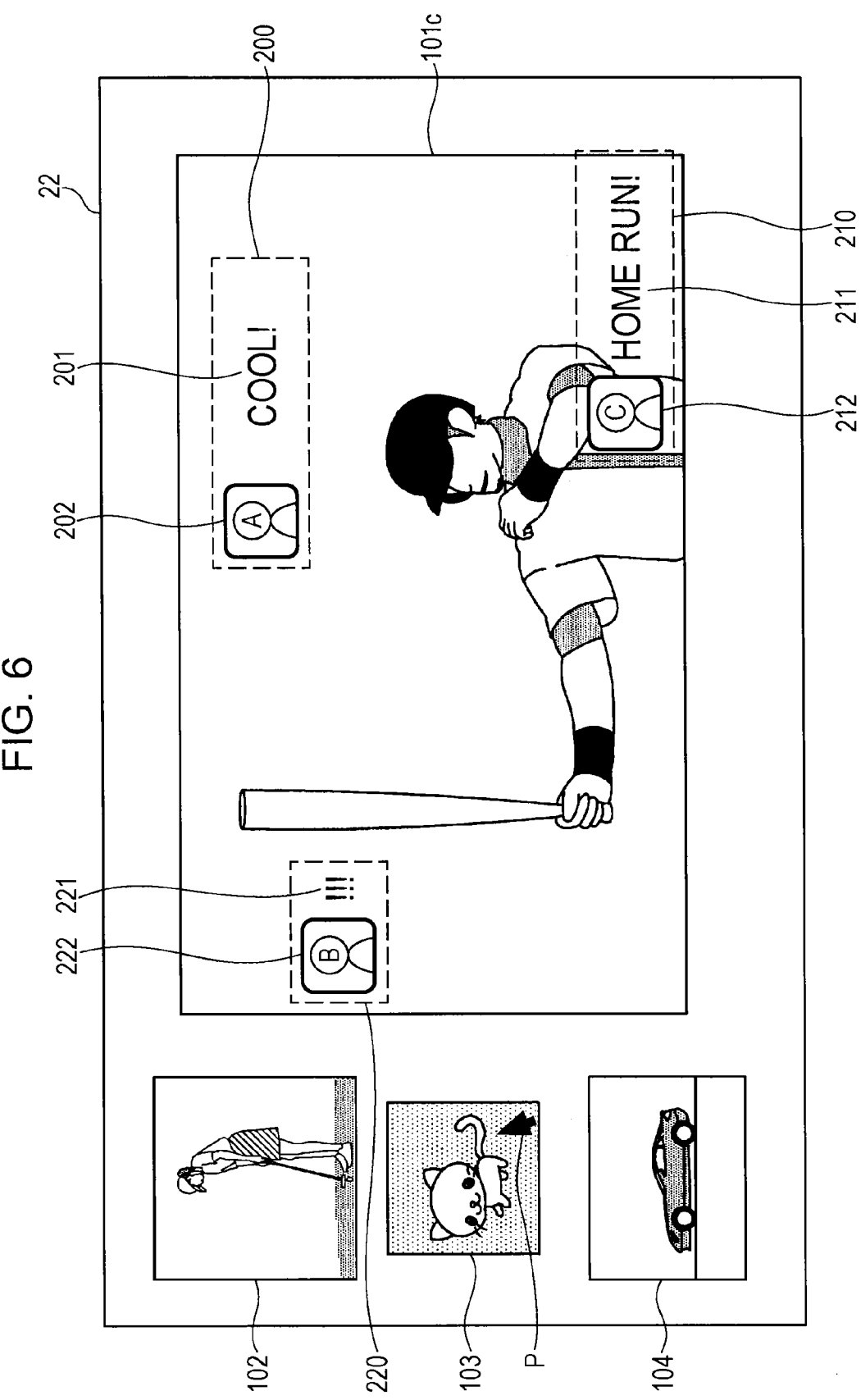
FIG. 6 is an explanatory diagram illustrating an example of a content displayed on a presentation section of a communication device.
Figure 13:
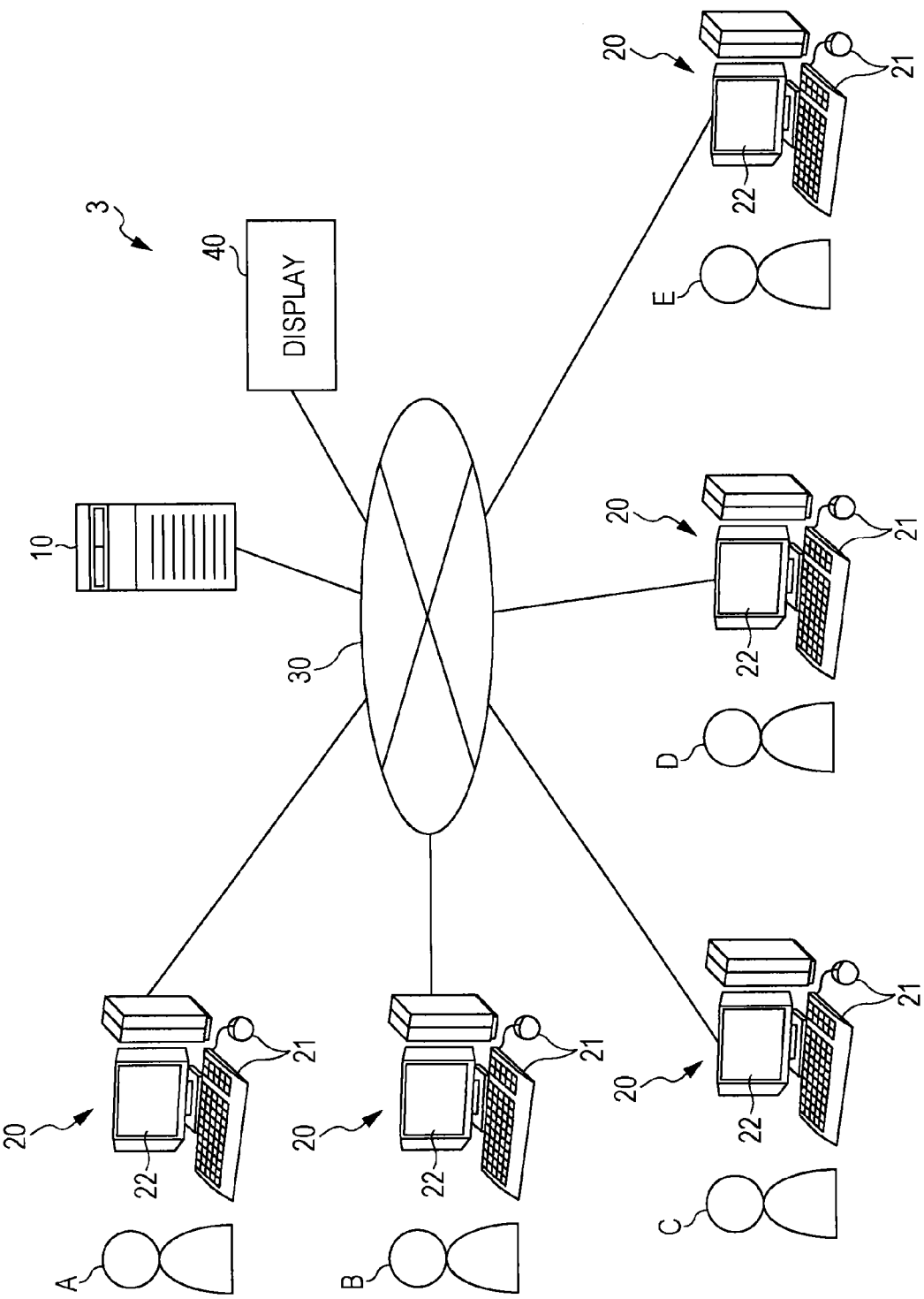
FIG. 13 is an explanatory diagram illustrating a configuration of an information processing system according to a third embodiment of the present disclosure.

FIG. 6 illustrates a display example. In this display example, the reference content 101 is replaced by a reference content 101c. The reference content 101c is produced by superimposing superimposed display contents 200, 210, and 220 on the reference content 101. That is to say, the presentation section 22 provides a display of superimposed display contents 200, 210, and 220 on the reference content 101. The superimposed display content 200 includes a short sentence content 201 created by the user A and a face-icon image 202 of the user A. The superimposed display content 210 includes a short sentence content 211 created by the user C and a face-icon image 212 of the user C. The superimposed display content 220 includes a short sentence content 221 created by the user B and a face-icon image 222 of the user B. In this regard, from step S60 to step S70, the server 10 may transmit a superimposed display content and position information indicating a display position of the superimposed display content to each of the communication devices 20 in place of transmitting a combined content. In this case, each of the communication devices 20 superimposes the superimposed display content on the reference content in display on the basis of the position information. In processing described later and second to fifth embodiments, the server 10 generates various combined contents, and transmits the contents to each of the communication devices 20 and the other components (for example, a display 40 illustrated in FIG. 13), but the above-described processing also applied to the processing. That is to say, the server 10 may transmit a superimposed display content and position information to each of the communication devices 20 and the other components.

In step S80, the control section 13 determines whether or not to continue to display the reference content. If determined to continue to display the reference content, the control section 13 returns to step S20. If determined to terminate display of the reference content, the superimposed display processing is terminated.

Figure 7:
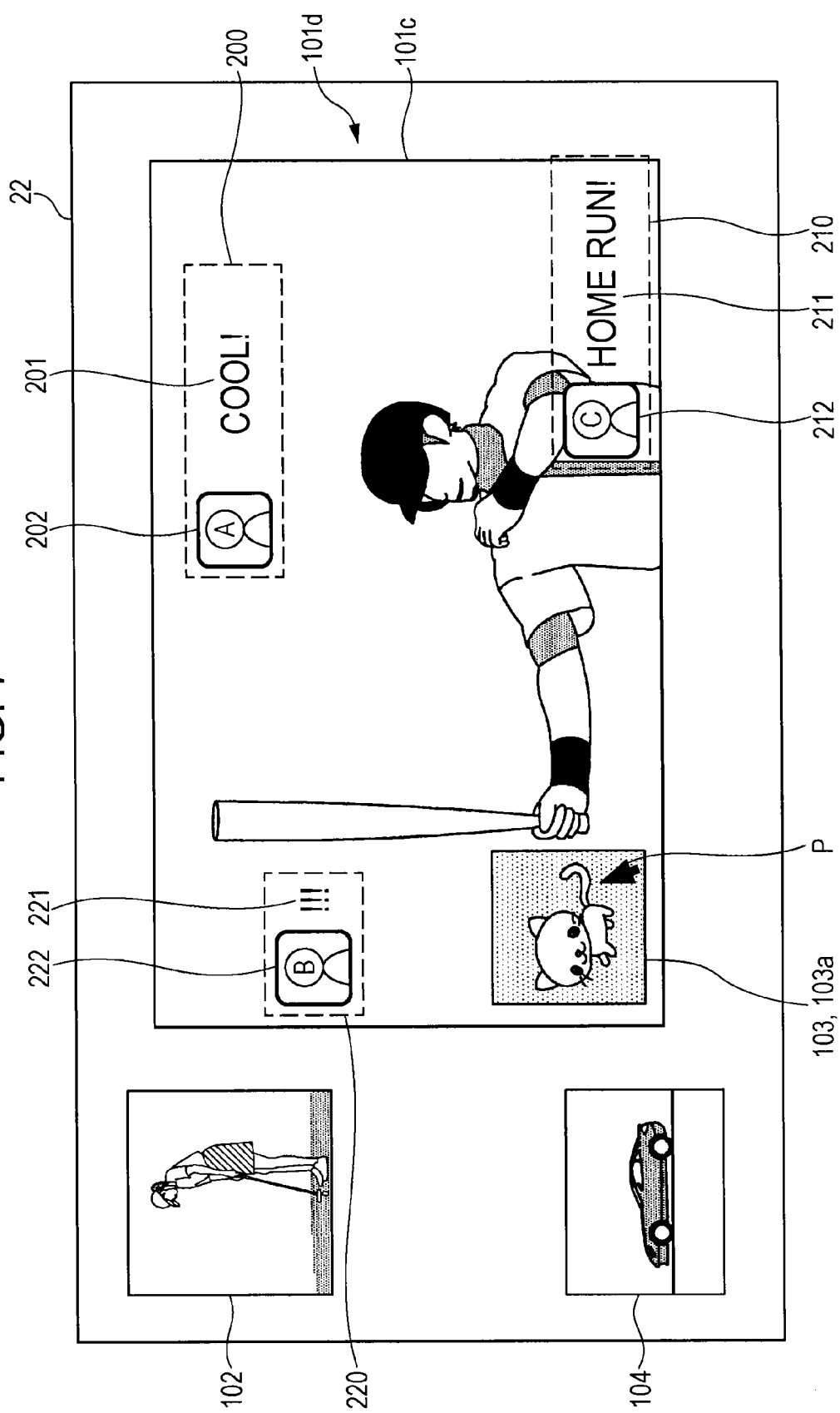
FIG. 7 is an explanatory diagram illustrating an example of a content displayed on a presentation section of a communication device.

In this regard, in the above-described step S10, it is possible for the user to superimpose the image content displayed on the presentation section 22 on the reference content. For example, as illustrated in FIG. 6 and FIG. 7, the user drags and drops the image content 103 at a requested position on the reference content 101c (here, a lower-left portion of the reference content 101c).

The control section 25 recognizes the position at which the image content 103 has been dropped (for example, a position of a center point of the image content 103) as a user-specified position, and recognizes the image content 103 to be a user content. The control section 25 outputs the user content and the position information indicating the user-specified position to the communication section 24. The communication section 24 transmits a superimposed-display request information including this information to the server 10. The content acquisition section 11 of the server 10 receives the superimposed-display request information, and outputs the information to the control section 13.

After that, in step S50, the control section 13 of the server 10 determines the image content 103, which is a user content, to be the superimposed display content 103a without change. Next, in step S60, the control section 13 combines superimposed display content 103a at the user-specified position on the reference content 101c so as to generate a combined content. In step S70, the control section 13 transmits the combined content to each of the communication devices 20 as a new reference content 103d. Accordingly, each of the communication devices 20 displays the reference content 101d produced by combining superimposed display content 103a at the lower left portion of the reference content 101c.

Figure 8:
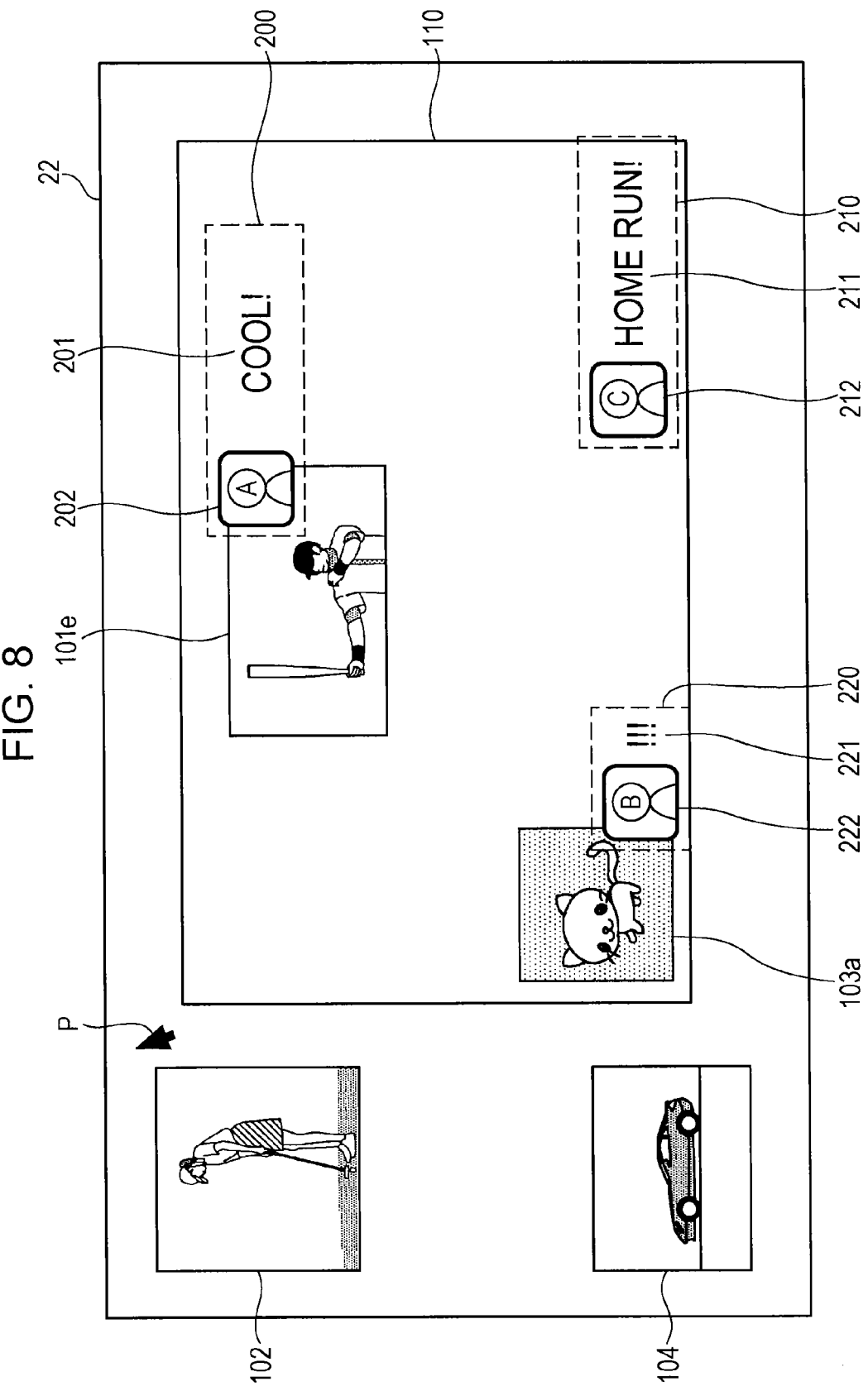
FIG. 8 is an explanatory diagram illustrating an example of a content displayed on a presentation section of a communication device.

Also, the control section 13 may display the reference content 110 as illustrated in FIG. 8 on the presentation section 22 of each of the communication devices 20. The reference content 110 is an image content on which tables are drawn. Even in this case, the control section 13 can display various superimposed display contents on the reference content 110 on the basis of the input operation by the above-described user. For example, in the example illustrated in FIG. 8, superimposed display contents 200 to 220, 101e, and 103a are superimposed on the reference content 110. Here, the superimposed display content 101e is produced by shrinking the above-described reference content 101.

Also, when a reference content is a moving-image content, the control section 13 allows the superimposed display content to follow a motion object (moving image) in the reference content. For example, in the above-described step S60, the control section 13 performs motion detection processing on the reference content so as to extract a motion object. And the control section 13 determines whether a condition in which a user-specified position is within the motion object or in the vicinity of the motion object is met or not. If this condition is met, the control section 13 generates a combined content whose superimposed display content follows the motion object. On the other hand, if this condition is not met, the control section 13 generates a combined content produced by superimposing the superimposed display content at the user-specified position on the reference content. After that, the control section 13 outputs the combined content to the content acquisition section 11 as a new reference content, and the content acquisition section 11 transmits the reference content to each of the communication devices 20.

A display example is illustrated in FIG. 9. In this example, a reference content 105 includes a motion object (image of a running child) 105a. Also, a superimposed display content 200 is superimposed in the vicinity of the motion object 105a. And the superimposed display content 200 moves so as to follow the motion object 105a.

As described above, in the first embodiment, when each of the communication devices 20 displays a reference content, the information processing system 1 obtains position information indicating a user-specified position and a user content from each of the communication devices 20. And the information processing system 1 superimposes a superimposed display content based on the user content at a user-specified position on the reference content that is being displayed by each of the communication devices 20. Accordingly, it is possible for the information processing system 1 to superimpose another content, that is to say, a user content at a position requested by the user on the reference content in display.

Also, a user content includes a character content, specifically a short sentence content, which the user has input in the communication device 20. Accordingly, a user is allowed to publish the own comment on the reference content to the other users. To put it another way, the user can view the reference content and comments by the other users at the same time.

In this regard, it is thought that the user attaches a quoted content, such as a photo content, a moving-image content, a link to a Web site, or the like to a writing content, such as a blog, etc. However, in this case, it is necessary for the user to describe which part of the quoted content has interested the user using a writing content.

In contrast, in the first embodiment, the user is allowed to superimpose his or her own comment at a requested position on the reference content, and thus it is not necessary to describe a position of the reference content using a comment. This is because the user is allowed to determine on which part of the reference content a comment is given on the basis of the position on which the comment is superimposed. For example, in the example in FIG. 6, the users A to C publish comments on a baseball player. Also, in the example in FIG. 9, the user A publishes a comment on the motion object 105a. Accordingly, it is possible for the user to have the other users understand the own comment easily.

Further, a user content includes user information on the user of the communication device 20, specifically, a face icon image of the user, and thus each user can publish a face icon image to the other users in addition to the short sentence content. Thereby, each user can easily determine which user has given each of the short sentence contents.

Further, the user content includes an image content selected by the user of the communication device 20. Accordingly, each user can superimpose a requested image content at a requested position on the reference content. Also, each user can superimpose a short sentence content on the image contents published by the other users.

2. Second Embodiment 2.1 Overall Configuration

Next, a description will be given of a second embodiment according to the present disclosure. As shown in FIG. 1, an information processing system 2 according to the second embodiment has a same configuration as that of the information processing system 1.

2.2 Processing Procedure by Information Processing System

Figure 10:
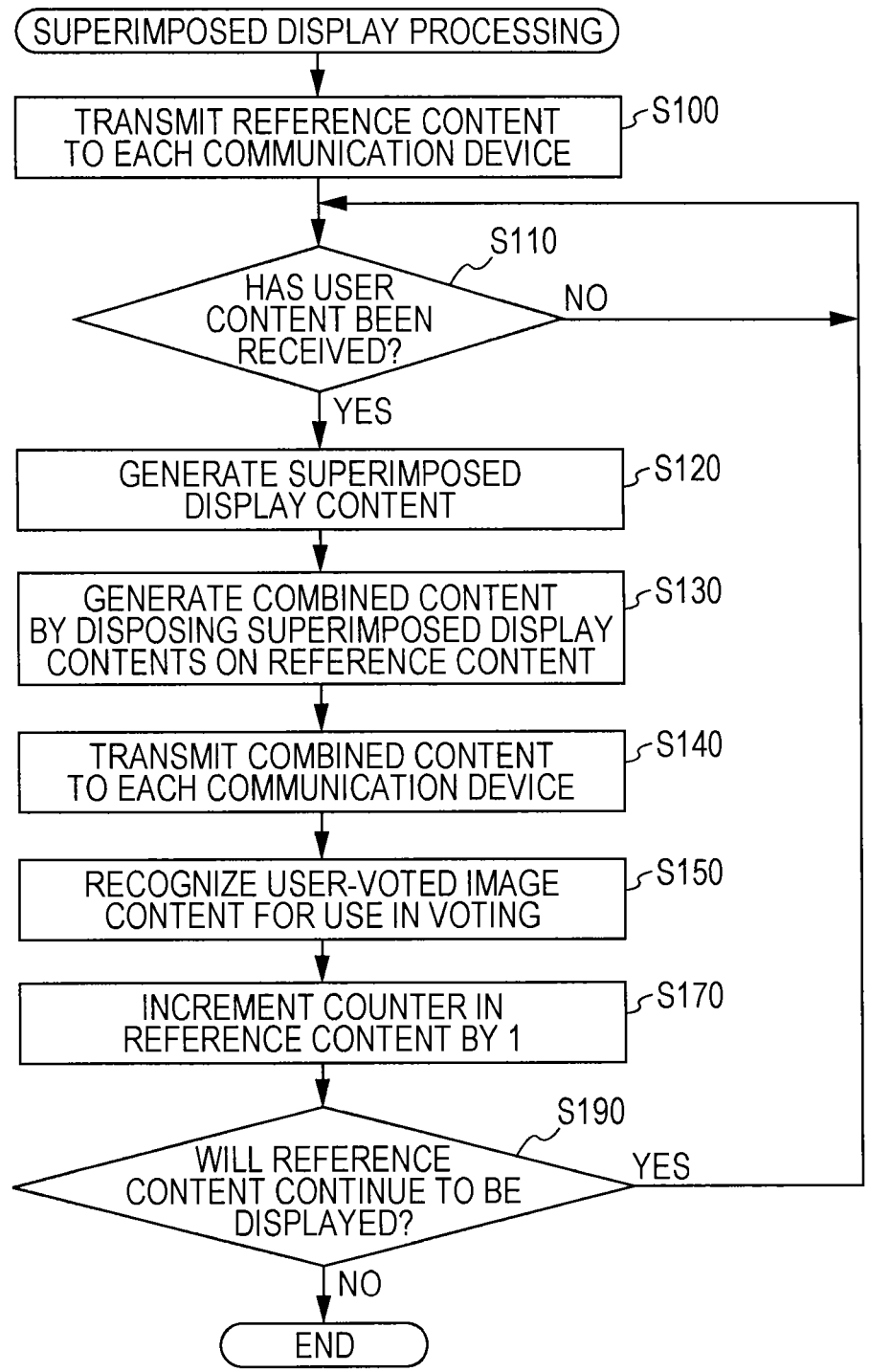
FIG. 10 is a flowchart illustrating a processing procedure by an information processing system according to a second embodiment of the present disclosure.

Next, a description will be given of a processing procedure by the information processing system 2 with reference to a flowchart illustrated in FIG. 10. The information processing system 2 performs superimposed display processing illustrated in FIG. 10. In step S100, a control section 13 of the server 10 obtains a reference content from the storage section 12, and outputs the reference content to the content acquisition section 11. Here, the reference content includes a plurality of image contents for use in voting, a face-icon display area, and a counter (determination result information). The image content for use in voting is an image content to be a target of voting by the users. The face-icon display area is provided for each image content for use in voting, and indicates a user who has voted on the image content for use in voting. The counter is provided for each image content for use in voting, and indicates a number of users who has voted on the image content for use in voting.

The content acquisition section 11 transmits a reference content to each of the communication devices 20. The communication section 24 of each of the communication devices 20 receives the reference content, and transmits the reference content to the control section 25. The control section 25 displays the reference content on the presentation section 22.

Figure 11:
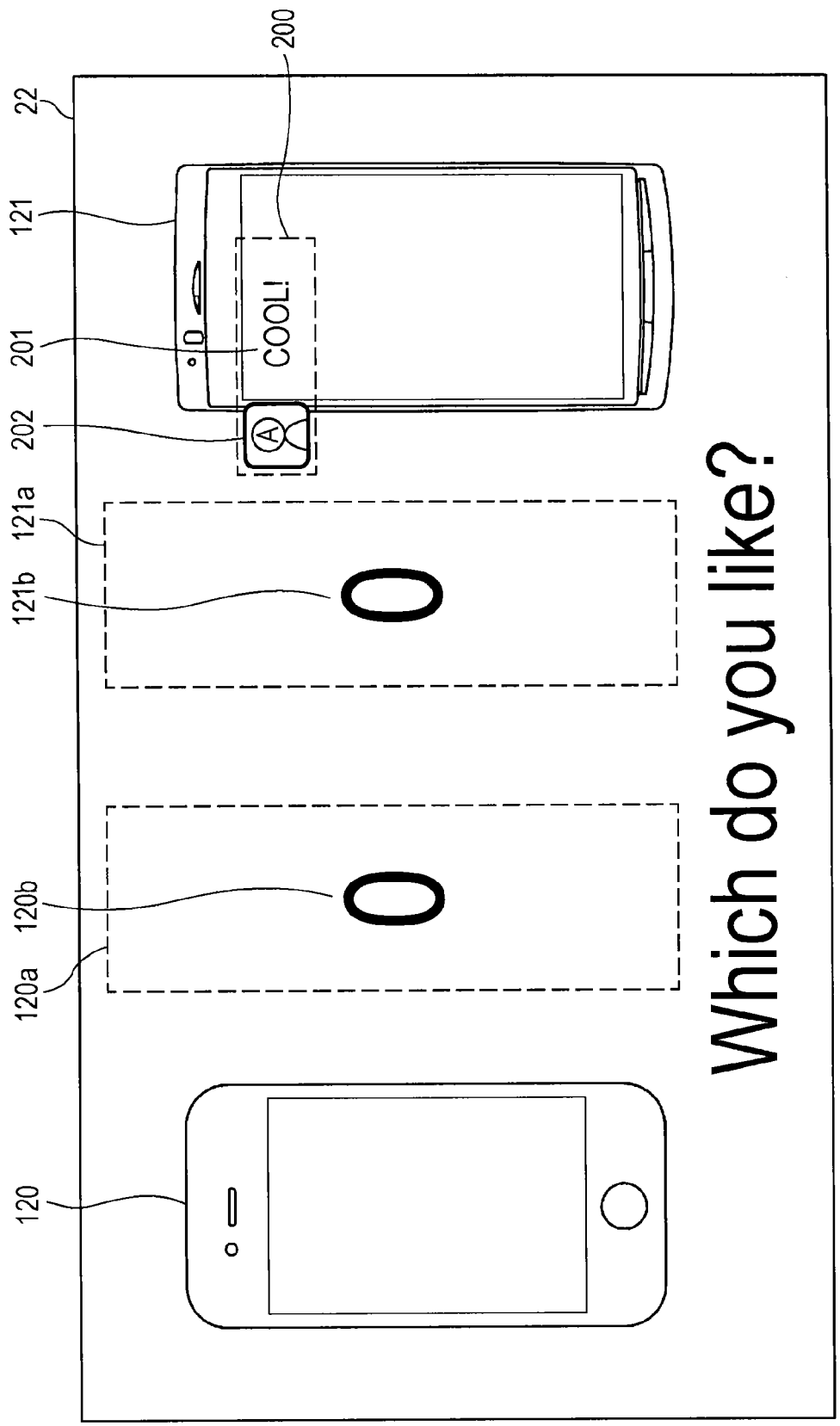
FIG. 11 is an explanatory diagram illustrating an example of a content displayed on a presentation section of a communication device.

FIG. 11 illustrates a display example. In this example, on the presentation section 22, image contents for use in voting 120 and 121, on which smart phones different from each other are drawn as a reference content, face-icon display areas 120*a* and 121*a*, and counters 120*b* and 121*b*, which become determination result information, are displayed. The face-icon display area 120*a* is an area indicating users who have voted for the image content for use in voting 120. The face-icon display area 121*a* is an area indicating users who have voted for the image content for use in voting 121. The counter 120*b* indicates a number of users who have voted for the image content for use in voting 120. The counter 121*b* indicates a number of users who have voted for the image content for use in voting 121. In this regard, the reference content is not limited to this, and for example, may be voting on which team will win a soccer game, etc. In this case, the image content for use in voting becomes, for example, an emblem, etc.

The user can superimpose a short sentence content at a requested position on the reference content 101 as a user content. A specific method of inputting and processing of the communication device 20 on user input are the same as those in the first embodiment. For example, when a user wants to vote for the image content for use in voting 120, the user specifies a position of the image content for use in voting 120 or the vicinity thereof, and inputs a short sentence content.

In step S110, the control section 13 waits until a user content, that is to say, superimposed-display request information, is given. If the superimposed-display request information is given, the control section 13 proceeds to step S120.

In step S120, the control section 13 combines the short sentence content and the face icon image so as to generate a superimposed display content. In step S130, the control section 13 superimposes a superimposed display content at a user-specified position on the reference content. Thereby, the control section 13 generates a combined content. In the combined content, for example, out of the superimposed display contents, a center point of the face-icon image portion is disposed on the user-specified position.

In step S140, the control section 13 outputs the combined content to the content acquisition section 11 as a new reference content, and stores the combined content into the storage section 12. The content acquisition section 11 transmits the reference content to each of the communication devices 20. The communication section 24 of each of the communication device 20 receives the reference content, and transmits the reference content to the control section 25. The control section 25 replaces the reference content in display by the reference content given from the communication section 24. Thereby, for example, as illustrated in FIG. 11, an image content produced by disposing the superimposed display content 200 on the image content for use in voting 121 is displayed on each of the communication devices 20 as a reference content. As described above, the superimposed display content 200 includes the short sentence content 201 input by the user A, and the face icon image 202 of the user A.

In step S150, the control section 13 recognizes an image content for use in voting, which has been voted by the user, that is to say, a voting-target image content. Specifically, the control section 13 determines whether or not a condition is met in which a short sentence content is blank (that is to say, the user content includes only a face icon image), and, a user-specified position indicates a position in some face-icon display area. If the condition is determined to be met, the control section 13 identifies a face-icon display area indicated by the user-specified position, and recognizes an image content for use in voting corresponding to the identified face-icon display area as a voting-target image content. In this regard, if the above-described condition is not met, the control section 13 proceeds to step S190. For example, as illustrated in FIG. 12, when a user content is only the face icon image 202, and if the user-specified position indicates a position in the face-icon display area 121*a*, the control section 13 recognizes the image content for use in voting 121 as a voting-target image content.

In step S170, the control section 13 generates counter-increment instruction information that instructs a counter corresponding to the voting-target image content to be incremented by 1, and outputs the counter to the content acquisition section 11. The content acquisition section 11 transmits the counter-increment instruction information to each of the communication devices 20. The communication section 24 of each of the communication devices 20 receives the counter-increment instruction information, and outputs the information to the control section 25. The control section 25 increments the counter corresponding to the voting-target image content of the reference content by 1 on the basis of the counter-increment instruction information.

Figure 12:
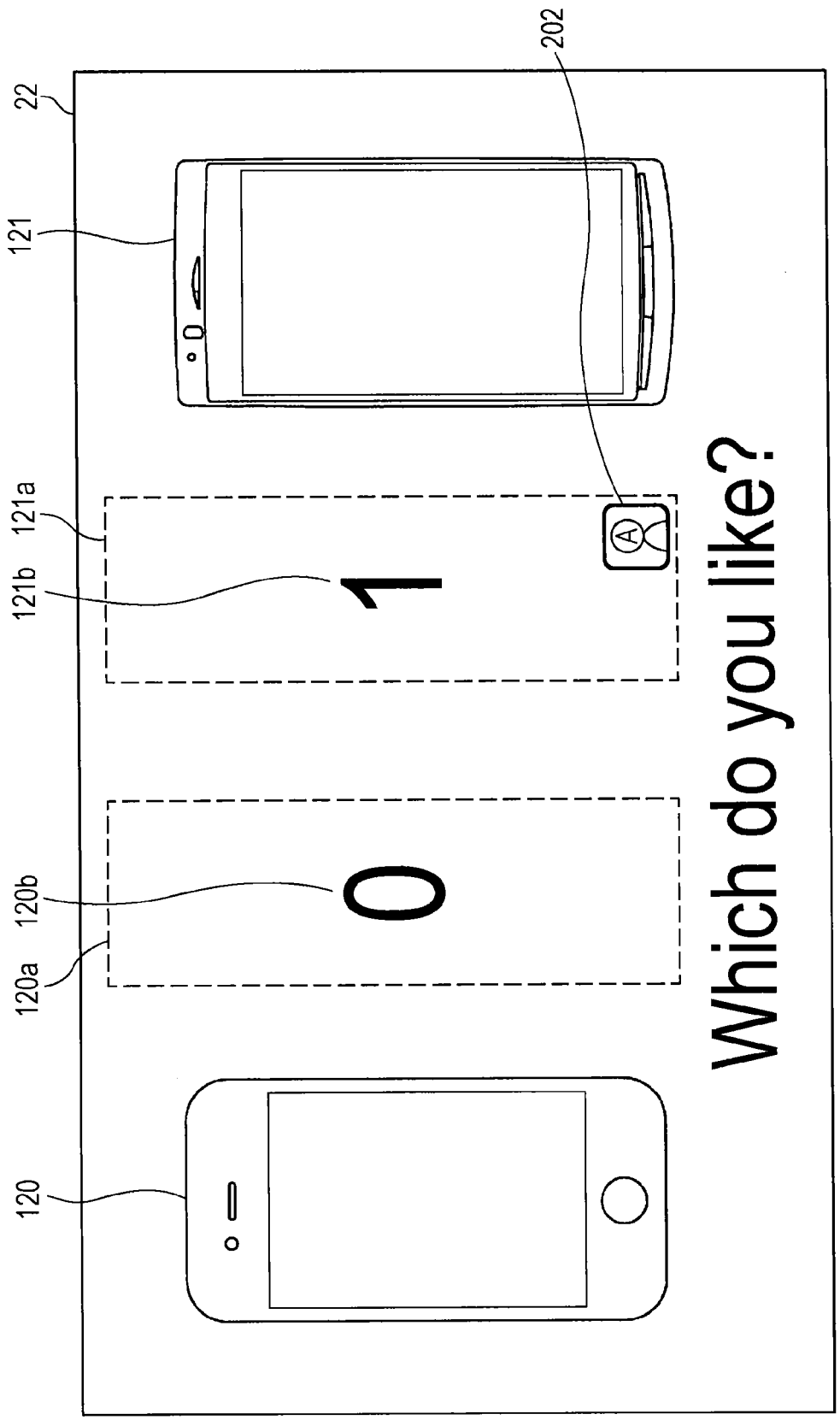
FIG. 12 is an explanatory diagram illustrating an example of a content displayed on a presentation section of a communication device.

Thereby, for example, as illustrated in FIG. 12, if a vote is given to the image content for use in voting 121, the reference content with the counter 121*b* that was incremented by 1 is displayed on each of the communication devices 20. In this regard, each of the communication devices 20 may output some sound effect (for example, a sound effect of "click") each time values of the counters 120*b* and 121*b* change. Such sound effect may be output only at the communication device 20 of the user who gave the vote.

In step S190, the control section 13 determines whether or not to continue to display the reference content. If determined to continue to display the reference content, the control section 13 returns to step S110. If determined to terminate to display the reference content, the superimposed display processing is terminated.

As described above, it is possible for the information processing system 2 according to the second embodiment to obtain the following advantages in addition to the same advantages of those of the first embodiment. That is to say, the information processing system 2 displays a plurality of image content for use in voting at different positions with each other as reference contents. And the information processing system 2 determines a voting-target image content on the basis of a user-specified position and a position of the image content for use in voting. And the information processing system 2 displays determination result information on a determination result, that is to say, a counter. Thereby, each user can understand for which image content for use in voting the other users have voted in real time.

3. Third Embodiment 3.1 Overall Configuration

Figure 14:
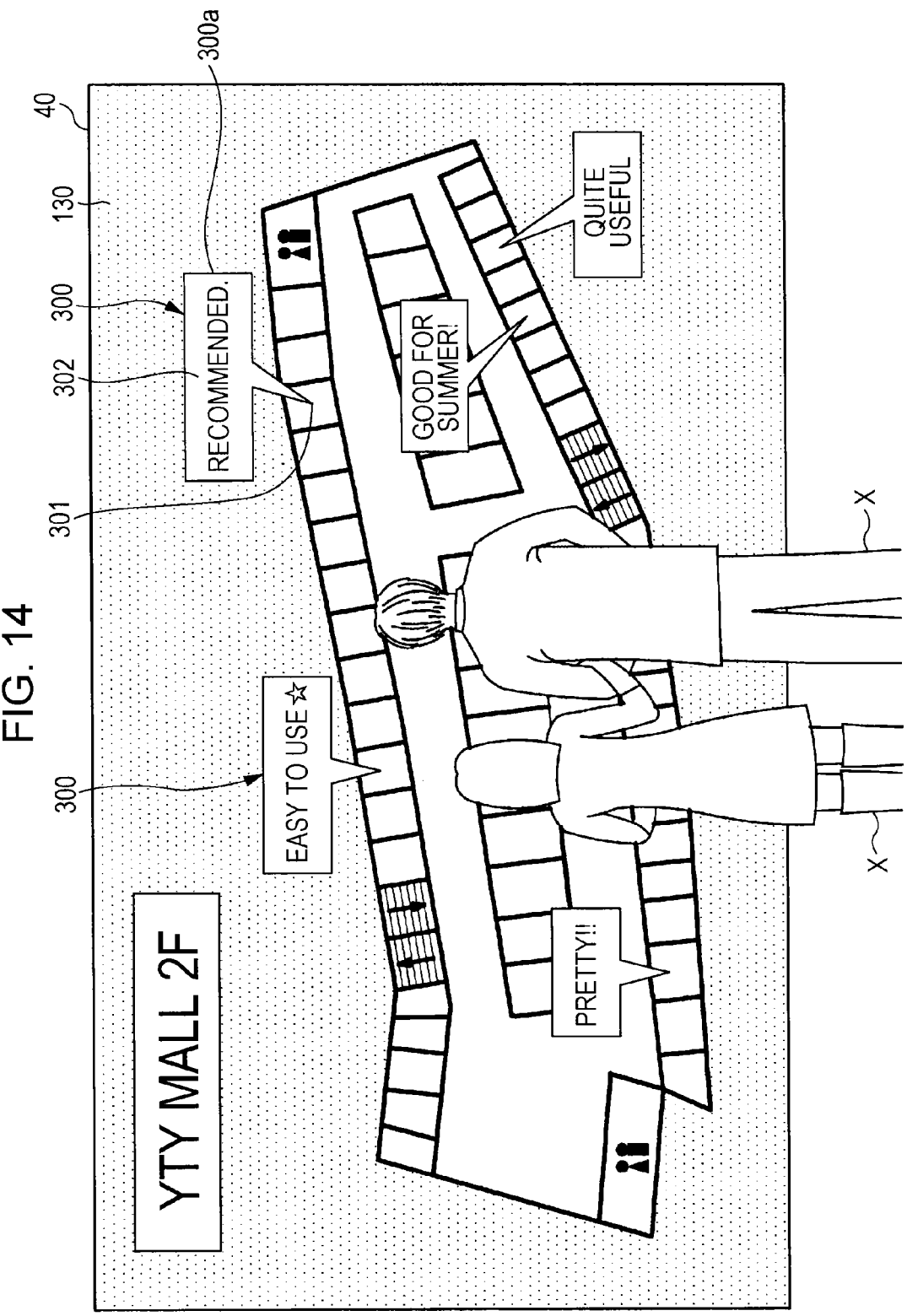
FIG. 14 is an explanatory diagram illustrating an example of a content displayed on a display.

Next, a description will be given of a third embodiment according to the present disclosure. First, a description will be given of an overall configuration of an information processing system 3 according to a third embodiment with reference to FIG. 13. The information processing system 3 has a same configuration as that of the information processing system 1 except that a display 40 is added to the information processing system 1. In this regard, as illustrated in FIG. 14, the display 40 is disposed, for example, at an event hall, in a department store, etc., and is viewed by an unspecified large number of viewers.

3.2 Processing Procedure by Information Processing System

Next, a description will be given of a processing procedure by the information processing system 3. Processing by the information processing system 3 is basically the same as the processing by the information processing system 1, and thus a description will be given of differences with the information processing system 1.

In step S10, the control section 13 of the server 10 obtains a reference content from the storage section 12, and outputs the reference content to the content acquisition section 11. The control section 13 outputs, for example, a reference content 130 illustrated in FIG. 14 to the content acquisition section 11. The reference content 130 is a floor plan of an event hall, a department store, etc. The content acquisition section 11 transmits the reference content to each of the communication devices 20 and the display 40. The communication section 24 of each of the communication devices 20 receives the reference content, and transmits the reference content to the control section 25. The control section 25 displays the reference content and the image content stored in the storage section 23 to the presentation section 22. On the other hand, the display 40 also displays the reference content.

The user can superimpose a short sentence content at a requested position on the reference content as a user content. A specific method of operation is the same as that of the first embodiment. The control section 25 determines the short sentence content to be a user content, and outputs the user content and position information indicating a user-specified position to the communication section 24. The communication section 24 transmits the superimposed-display request information including the information to the server 10. The content acquisition section 11 of the server 10 receives superimposed-display request information, and outputs the information to the control section 13.

In step S50, the control section 13 generates a superimposed display content produced by disposing the short sentence content in a balloon image. In step S60, the control section 13 disposes the superimposed display content at a user-specified position on the reference content. Specifically, the control section 13 determines a start point of the balloon image to be a user-specified position. Thereby, the control section 13 generates a combined content.

In step S70, the control section 13 outputs, as a new reference content, the combined content to the content acquisition section 11, and stores the combined content to the storage section 12. The content acquisition section 11 transmits the reference content to each of the communication devices 20 and the display 40. The communication section 24 of each of the communication devices 20 receives the reference content, and transmits the reference content to the control section 25. The control section 25 replaces the reference content in display by the reference content given from the communication section 24. In the same manner, the display 40 also replaces the reference content in display by the newly given reference content. A display example is illustrated in FIG. 14. In FIG. 14, a plurality of superimposed display contents are disposed on the reference content 130. Each of the superimposed display contents 300 includes a balloon image 300*a*, and a short sentence content 302 disposed in the balloon image. A start point of the balloon image 300*a*, that is to say, a start point 301 of the superimposed display content 300 indicates a user-specified position.

As described above, it is possible for the information processing system 3 according to the third embodiment to obtain the following advantages in addition to the same advantages of those of the first embodiment. That is to say, as illustrated in FIG. 14, the information processing system 3 according to the third embodiment displays the reference content and the superimposed display content on the display 40 that is viewed by an unspecified large number of viewers X. Accordingly, the viewers X can view the reference content and a comment of each user on the reference content. Further, the viewers X refer to a display position of each comment so that the viewers X can easily understand on which part of the reference content each comment is given. In this regard, in the third embodiment, by disposing a display at each conference room for a teleconference, it is possible to apply the information processing system 3 to a so-called teleconference system. In this case, each user becomes a participant of the teleconference system.

4. Fourth Embodiment 4.1 Overall Configuration

Figure 15:
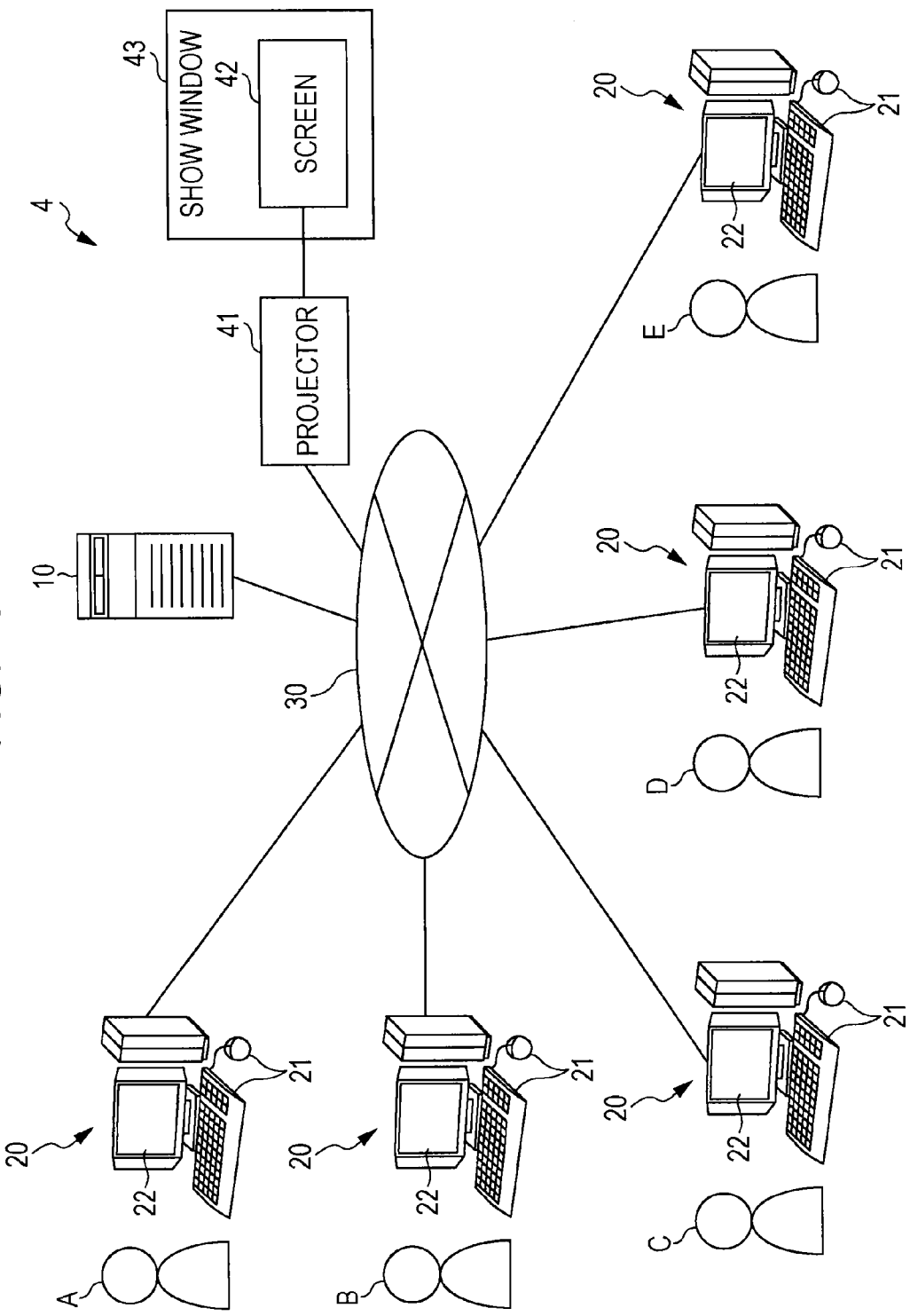
FIG. 15 is an explanatory diagram illustrating a configuration of an information processing system according to a fourth embodiment of the present disclosure.
Figure 16:
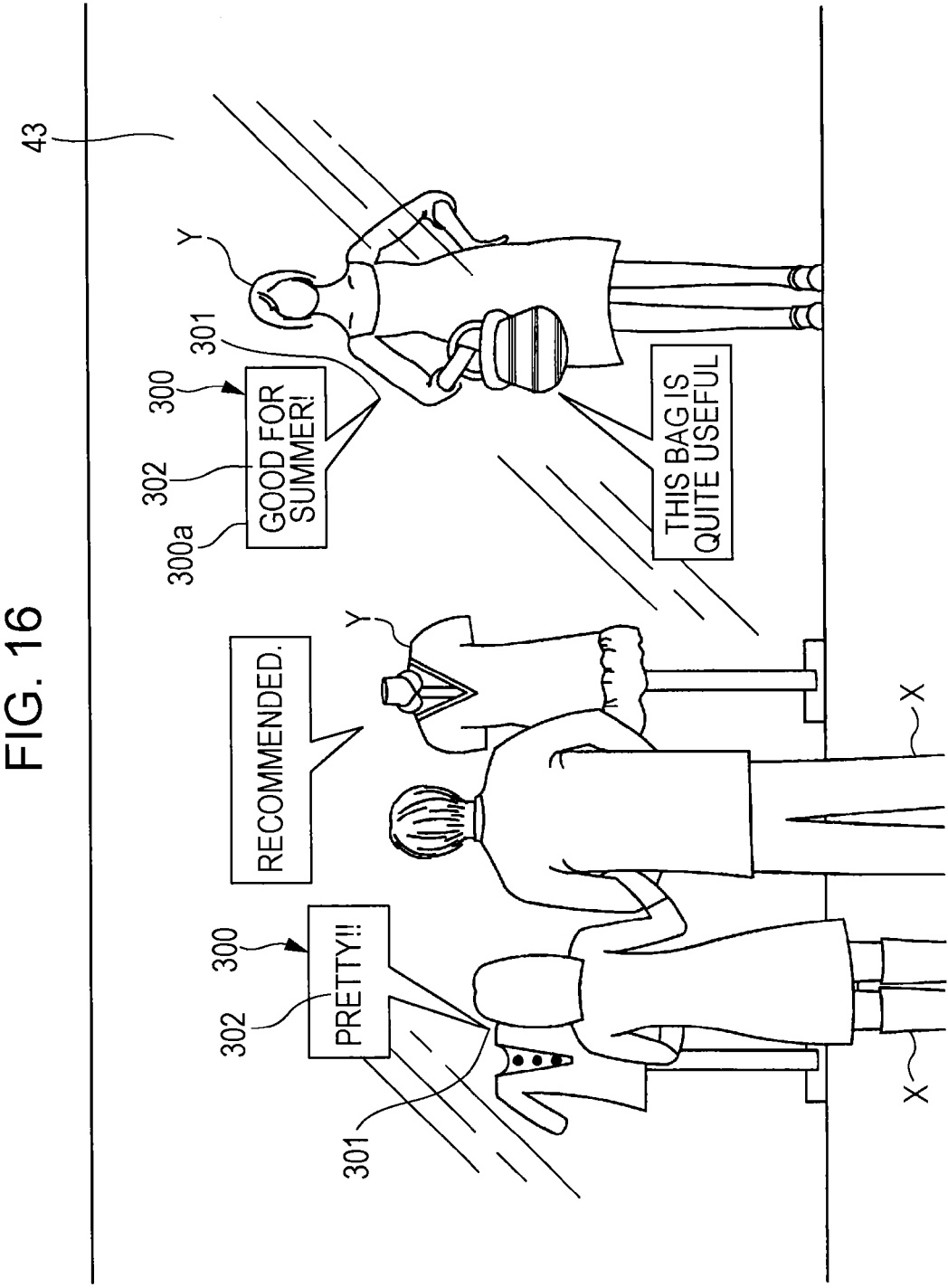
FIG. 16 is an explanatory diagram illustrating an example of a content displayed by being superimposed on a show window.
Figure 17:
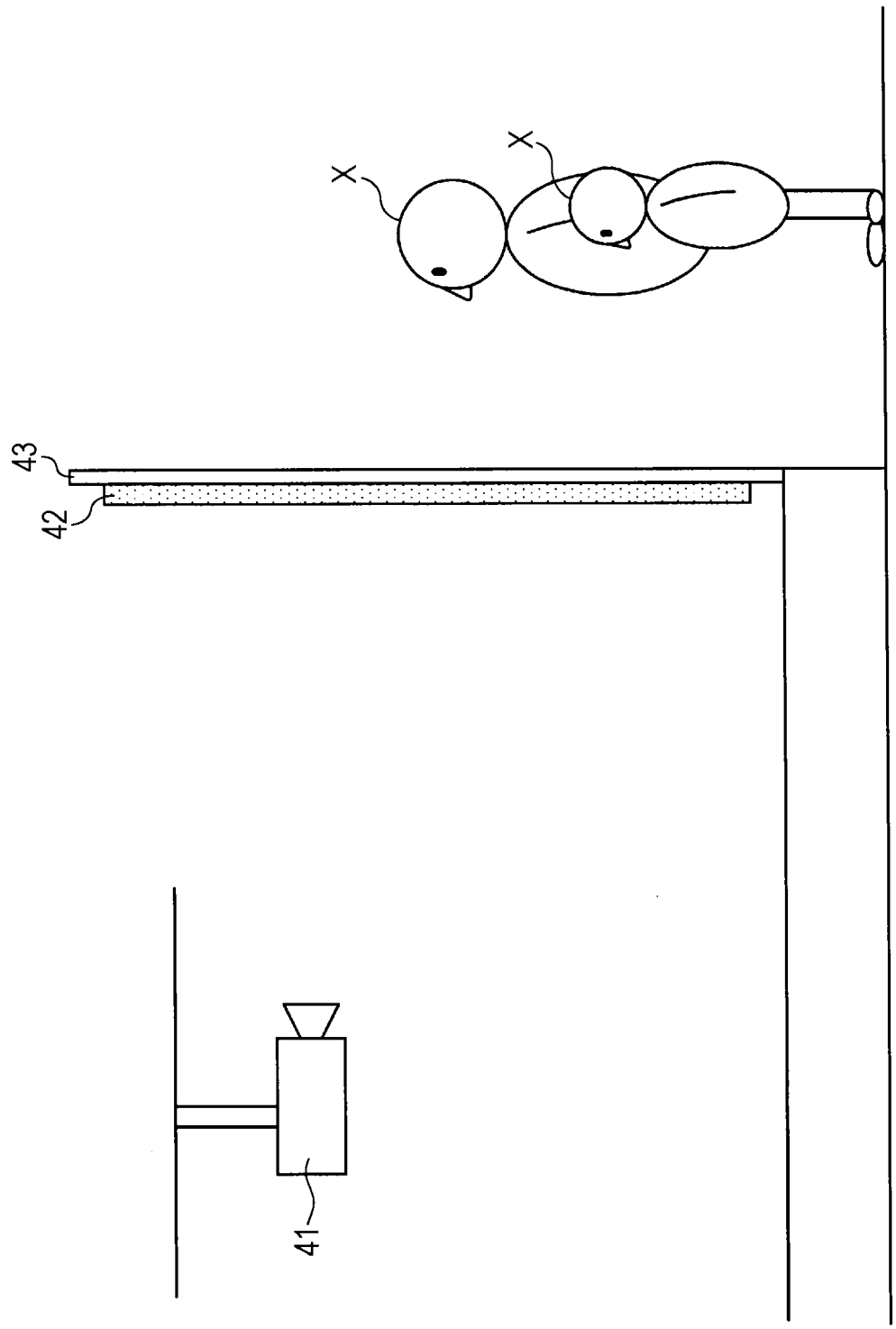
FIG. 17 is an explanatory diagram illustrating a configuration for displaying a content superimposed on a show window.

Next, a description will be given of a fourth embodiment of the present disclosure. First, a description will be given of an overall configuration of an information processing system 4 according to the fourth embodiment with reference to FIG. 15. The information processing system 4 is produced by adding a projector 41, a screen 42, and a show window 43 to the information processing system 1. As illustrated in FIG. 16 and FIG. 17, one or a plurality of objects Y are disposed in an exhibition booth in a show window 43. The screen 42 is disposed on an exhibition-booth side of the show window 43. The projector 41 is disposed on a ceiling of an exhibition booth, and projects the superimposed display content onto the screen 42. That is to say, the projector 41 displays the superimposed display content on the screen 42. The objects Y in the show window 43 is viewed by an unspecified large number of viewers X.

4.2 Processing Procedure by Information Processing System

Next, a description will be given of a processing procedure by the information processing system 4. Processing by the information processing system 4 is basically the same as the processing by the information processing system 1, and thus a description will be given of differences with the information processing system 1.

In step S10, the control section 13 of the server 10 obtains a tentative reference content from the storage section 12, and outputs the tentative reference content to the content acquisition section 11. Here, the tentative reference content is a photo content obtained by shooting the show window 43 from a side of the viewers X. This photo content contains the objects Y. The content acquisition section 11 transmits the tentative reference content to each of the communication devices 20. The communication section 24 of each of the communication devices 20 receives the tentative reference content, and transmits the tentative reference content to the control section 25. The control section 25 displays the tentative reference content and the image content stored in the storage section 23 onto the presentation section 22.

The user can superimpose a short sentence content at a requested position on the tentative reference content as a user content. A specific method of operation is the same as that of the first embodiment. The control section 25 determines the short sentence content to be a user content, and outputs the user content and position information indicating the user-specified position to the communication section 24. The communication section 24 transmits superimposed-display request information including this information to the server 10. The content acquisition section 11 of the server 10 receives the superimposed-display request information, and outputs the superimposed-display request information to the control section 13.

In step S20, the control section 13 waits until a user content, that is to say, superimposed-display request information is given. If superimposed-display request information is given, the control section 13 proceeds to step S30.

In step S30, the control section 13 determines whether a condition in which there are a predetermined number of superimposed display contents or more in the tentative reference content is met or not. Here, the superimposed display content is a content produced by disposing a short sentence content in a balloon image in the same manner as the third embodiment. If determined that the condition is met, the control section 13 proceeds to step S40. If determined that the condition is not met, the control section 13 proceeds to step S50. In step S40, the control section 13 erases (deletes) an oldest superimposed display content from the tentative reference content.

In step S50, the control section 13 generates a superimposed display content. In step S60, the control section 13 disposes the superimposed display content at a user-specified position on the tentative reference content. Specifically, the control section 13 determines a start point of the balloon image to be the user-specified position. Thereby, the control section 13 generates a combined content.

In step S70, the control section 13 outputs the combined content to the content acquisition section 11 as a new tentative reference content, and stores the tentative reference content into the storage section 12. The content acquisition section 11 transmits the tentative reference content to each of the communication devices 20 and the projector 41. The communication section 24 of each of the communication devices 20 receives the tentative reference content, and transmits the tentative reference content to the control section 25. The control section 25 replaces the tentative reference content in display by the tentative reference content given from the communication section 24.

On the other hand, the projector 41 displays only a part of the superimposed display content out of the received tentative reference contents on the screen 42. A display example is illustrated in FIG. 16. In this example, one or a plurality of superimposed display contents 300 are displayed on the screen 42, substantially in the show window 43. The superimposed display contents 300 include balloon images 300a and short sentence contents 302 disposed in the balloon images. A start point of the balloon image 300a, that is to say, a start point 301 of the superimposed display content 300 indicates a user-specified position.

Here, the tentative reference content is a photo content obtained by shooting the show window 43 from a side of the viewers X. Accordingly, the user substantially specifies a position on the show window 43, and inputs a short sentence content 302. Accordingly, the viewers X can view comments on the objects Y by individual users. On the other hand, the projector 41 displays only the superimposed display content onto the screen 42, but the show window 43 already displays the objects Y. Accordingly, the viewers X can view a same scene as the tentative reference contents viewed by the individual users.

In step S80, the control section 13 determines whether to continue to display the tentative reference content or not. If determined to continue to display the tentative reference content, the control section 13 returns to step S20. If determined to terminate to display the reference content, the superimposed display processing is terminated.

As described above, by the fourth embodiment, it is possible for the information processing system 4 to obtain the following advantages in addition to the same advantages as those of the information processing system 1. That is to say, as illustrated in FIG. 16, the information processing system 4 displays the superimposed display content on the show window 43 that is viewed by an unspecified large number of viewers X. Accordingly, the viewers X can view the objects Y and comments on the objects Y by the individual users. Further, the viewers X refer to display positions of the individual comments so that the viewers X can easily understand on which objects Y each the individual comments are given.

5. Fifth Embodiment 5.1 Overall Configuration

Figure 18:
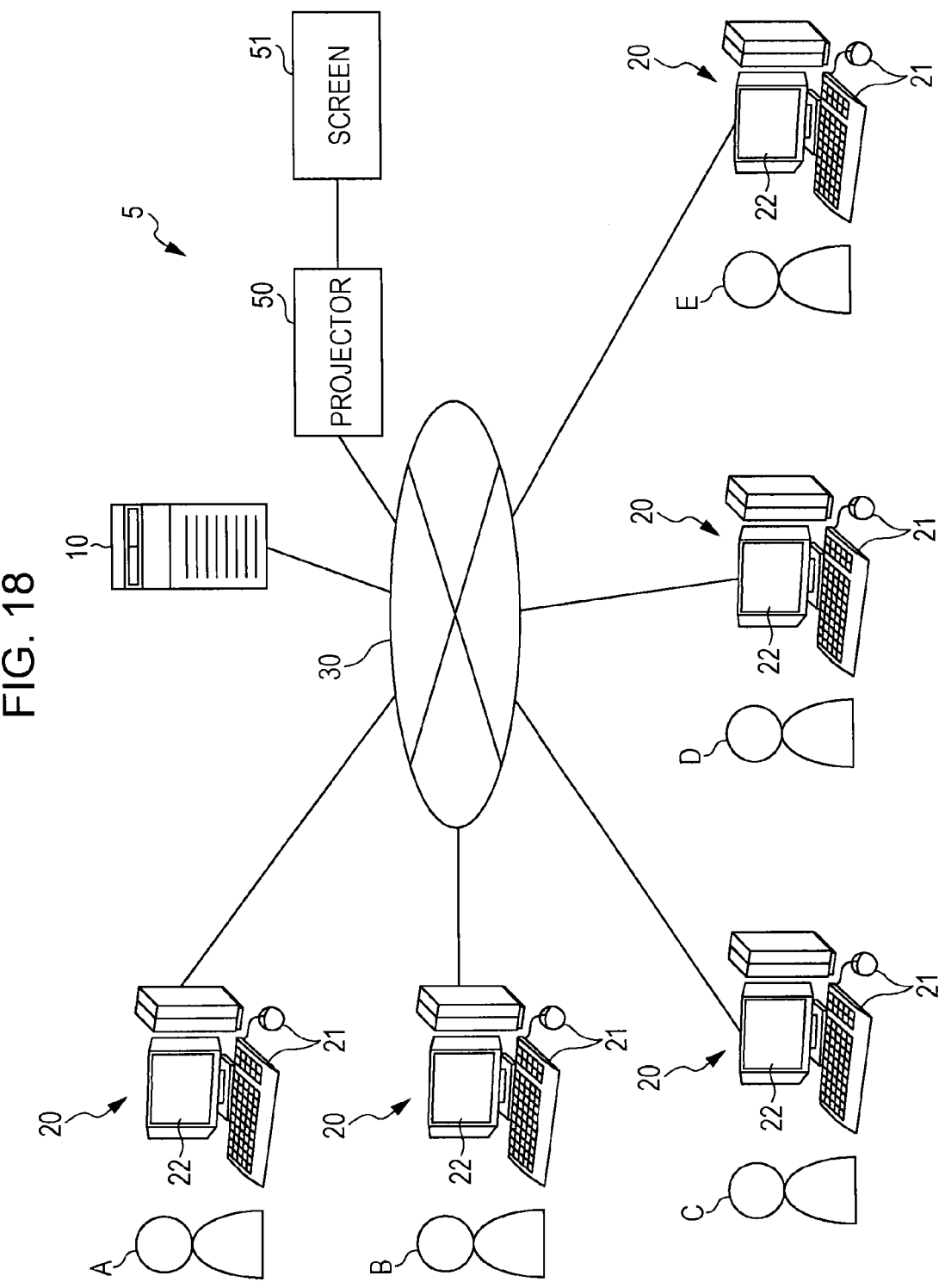
FIG. 18 is an explanatory diagram illustrating a configuration of an information processing system according to a fifth embodiment of the present disclosure.
Figure 19:
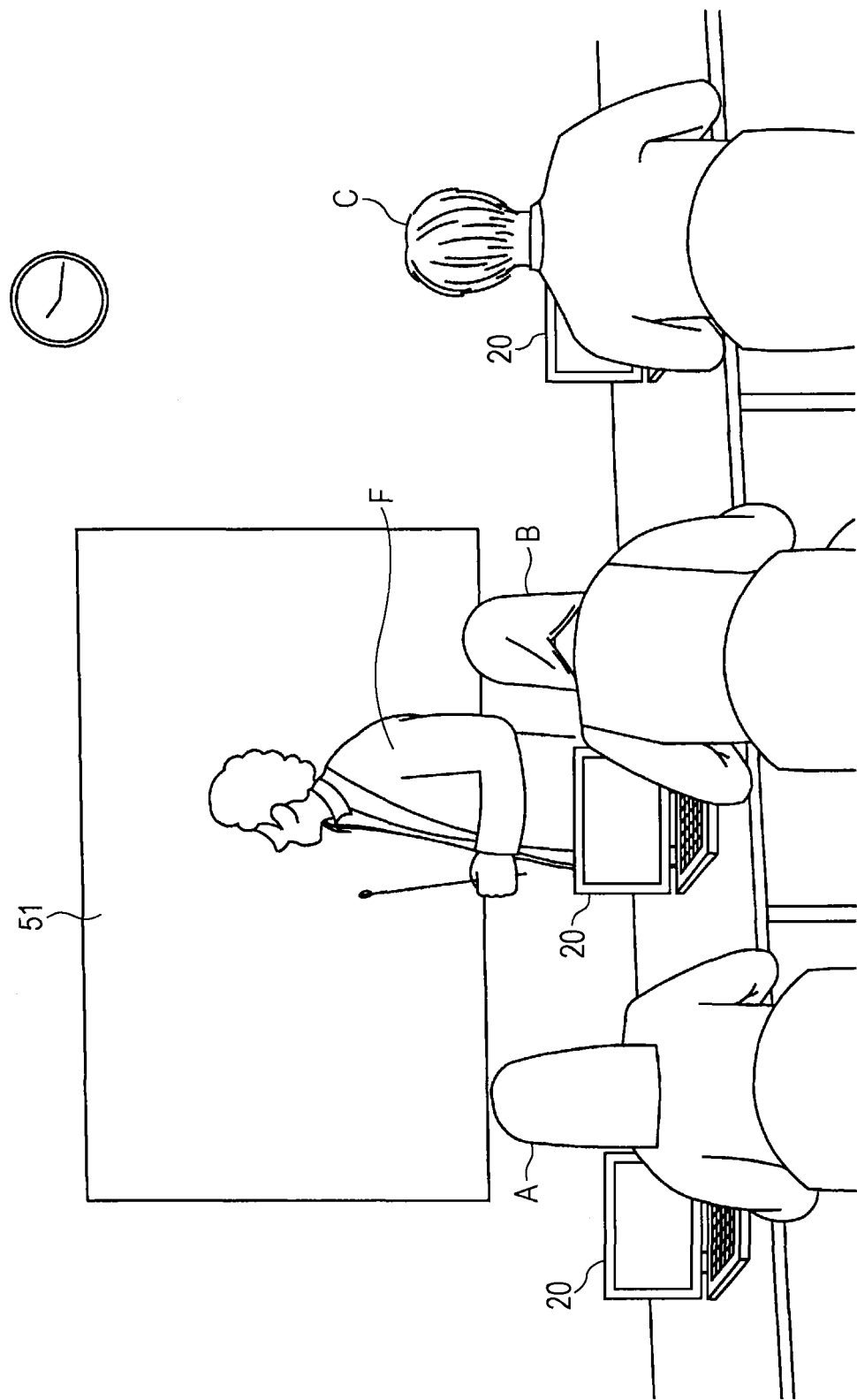
FIG. 19 is an explanatory diagram illustrating an example to which the fifth embodiment is applied.

Next, a description will be given of a fifth embodiment of the present disclosure. First, a description will be given of an overall configuration of an information processing system 5 according to the fifth embodiment with reference to FIG. 18. The information processing system 5 is produced by adding a projector 50 and a screen 51 to the information processing system 1. As illustrated in FIG. 19, the screen 51 displays various presentation documents in a presentation. That is to say, the fifth embodiment is a technique suitable for presentation. In the presentation illustrated in FIG. 19, a presenter F carries out presentation, and a plurality of users including users A to E watch the presentation.

5.2 Processing Procedure by Information Processing System

Figure 20:
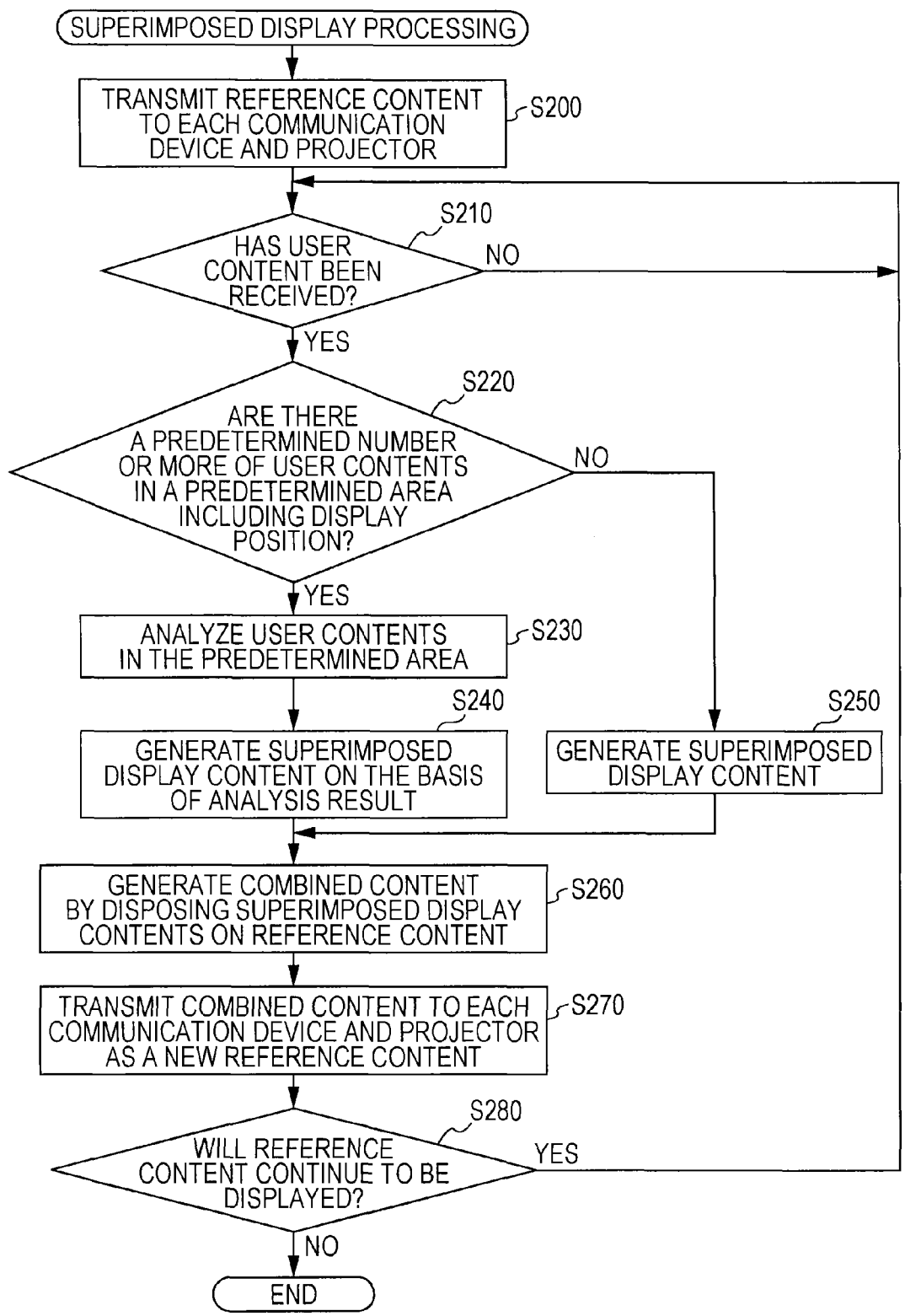
FIG. 20 is a flowchart illustrating a processing procedure by the information processing system.

Next, a description will be given of a processing procedure by the information processing system 5 with reference to a flowchart illustrated in FIG. 20. As illustrated in FIG. 20, the information processing system 5 performs superimposed display processing.

In step S200, the control section 13 of the server 10 obtains the reference content from the storage section 12, and outputs the reference content to the content acquisition section 11. The control section 13 outputs, for example, a reference content 140 illustrated in FIG. 21 to the content acquisition section 11. The reference content 140 is a so-called presentation document, and includes a sequential-line-graph image 141. The reference content used in the fifth embodiment may be any kind of documents as far as presentation documents, and may be, for example, a bar chart image, etc.

The content acquisition section 11 transmits the reference content to each of the communication devices 20 and the projector 50. The communication section 24 of each of the communication devices 20 receives the reference content, and transmits the reference content to the control section 25. The control section 25 displays the reference content and the image content stored in the storage section 23 onto the presentation section 22. The projector 50 displays the reference content on the screen 51.

The user can superimpose a short sentence content at a requested point on the reference content as a user content. A specific method of operation is the same as that of the first embodiment. The control section 25 determines a short sentence content and a face icon image to be a user content, and outputs the user content and position information indicating a user-specified position to the communication section 24. The communication section 24 transmits the superimposed-display request information including the information to the server 10. The content acquisition section 11 of the server 10 receives superimposed-display request information, and outputs the information to the control section 13.

In step S210, the control section 13 waits until the user content, that is to say, the superimposed-display request information is given. If the superimposed-display request information is given, the control section 13 proceeds to step S220.

In step S220, the control section 13 determines whether a condition where a number of user contents in a predetermined area including a user-specified position, that is to say, a number of superimposed display contents generated in step S250 is a predetermined number or more is met or not. If determined that the condition is met, the control section 13 proceeds to step S230. If determined that the condition is not met, the control section 13 proceeds to step S250.

In step S230, the control section 13 analyzes all the user contents, specifically, short sentence contents in a predetermined range so as to grasp contents common to a large portion of these user contents (for example, eighty percent or more). For such methods of analysis, a mood analysis, or a morphological analysis, etc., is considered.

In step S240, the control section 13 generates a superimposed-display content on the basis of an analysis result. The superimposed display content generated here includes an area image indicating a predetermined range, a short sentence content indicating the analysis result, and a balloon image including the short sentence content. The short sentence content indicates contents common to a large portion of user contents out of user contents in a predetermined range. A start point of a balloon image is disposed on the area image or in the vicinity of the area image. Also, the control section 13 calculates an arithmetic mean of all the user-specified positions in a predetermined range, and determines the obtained value as a result to be a user-specified position of the superimposed display content. In this regard, here, the contents common to a large portion of the user contents in a predetermined range is displayed by a short sentence content. However, the other display modes (for example, color, etc.) may be used for display. For example, a predetermined range may be displayed in color.

In step S250, the control section 13 generates a superimposed display content. The superimposed display content generated here is produced by combining the face icon image and the short sentence content. The superimposed display content may be produced by disposing the face icon image and the short sentence content in the balloon image. In this case, the start point of the balloon image indicates the user-specified position.

In step S260, the superimposed-display content is disposed at the user-specified position on the reference content. Specific processing is the same as that of the first embodiment. In this regard, in the case where the superimposed-display content includes an area image, a center of the area image matches the user-specified position.

In step S270, the control section 13 outputs the combined content to the content acquisition section 11 as a new reference content, and stores the combined content into the storage section 12. The content acquisition section 11 transmits the reference content to each of the communication devices 20 and the projector 50. The communication section 24 of each of the communication devices 20 receives the reference content, and transmits the reference content to the control section 25. The control section 25 replaces the reference content in display by the reference content given from the communication section 24. In the same manner, the projector 50 replaces the reference content in display on the screen 51 by the newly received reference content.

Figure 21:
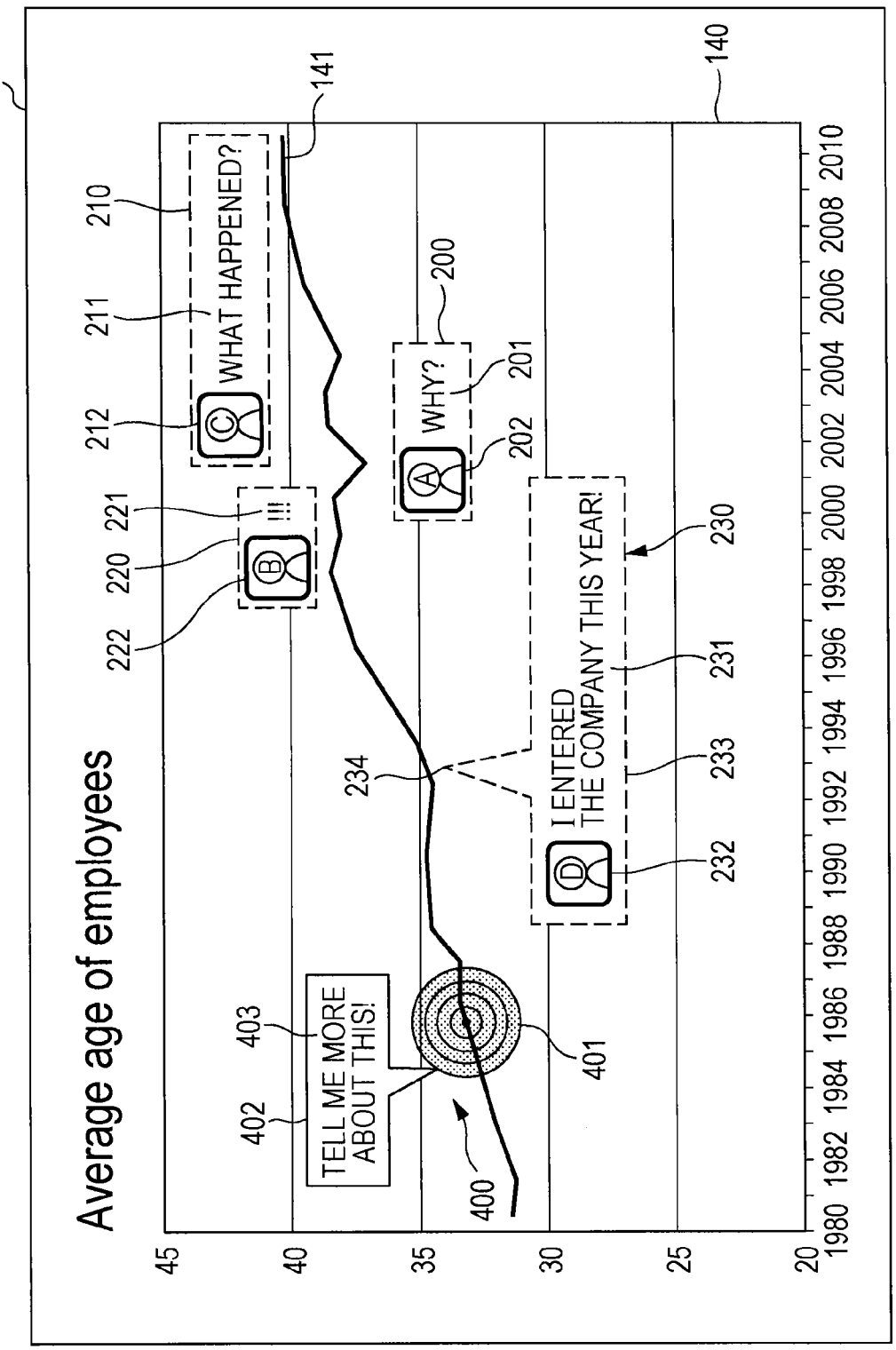
FIG. 21 is an explanatory diagram illustrating an example of a content displayed on a screen.

A display example is illustrated in FIG. 21. In this example, the superimposed display contents 200 to 230, and 400 are disposed on the reference content 140. The superimposed display content 230 is produced by disposing a short sentence content 231 created by a user D and a face icon image 232 of the user D are disposed in a balloon image 233. A start point 234 of the balloon image 233 indicates a user-specified position. In this regard, whether to use a balloon image as a superimposed display content or not may be determined freely by the control section 13, but also may be determined by the user. As illustrated in FIG. 21, the superimposed display content 230 with the balloon image can instruct the user-specified position by pinpointing. Accordingly, if the user wants to explicitly specify a user-specified position, the user can use a superimposed display content with a balloon image.

The superimposed display content 400 includes an area image 401, a balloon image 402, a short sentence content 403 in a balloon image. A center of the area image 401 indicates a position produced by calculating an arithmetic mean of the user-specified positions in a range indicated by the area image 401. The short sentence content 403 indicates contents common to a large portion of the user contents out of the user contents in a range indicated by the area image 401.

In step S280, control section 13 determines whether to continue to display the tentative reference content or not. If determined to continue to display the tentative reference content, the control section 13 returns to step S210. If determined to terminate to display the reference content, the superimposed display processing is terminated.

As described above, by the fifth embodiment, it is possible for the information processing system 5 to obtain the following advantages in addition to the same advantages as those of the information processing system 1. That is to say, as illustrated in FIG. 21, the information processing system 5 performs analysis processing for analyzing the user contents in a predetermined range, and generate a superimposed display content on the basis of a result of the analysis processing. Accordingly, for example, if there are a large number of user contents in the predetermined range, the information processing system 5 generates a superimposed display content indicating contents common to the user contents, and can superimpose the user contents on the reference content. At the same time, when there are a large number of user contents in a predetermined range, if these user contents are displayed as the superimposed display content, there is a possibility that information in the predetermined range becomes complicated. Accordingly, if there are a large number of user contents in a predetermined range, the information processing system 5 can arrange the information in the predetermined range, and display the information.

Figure 22:
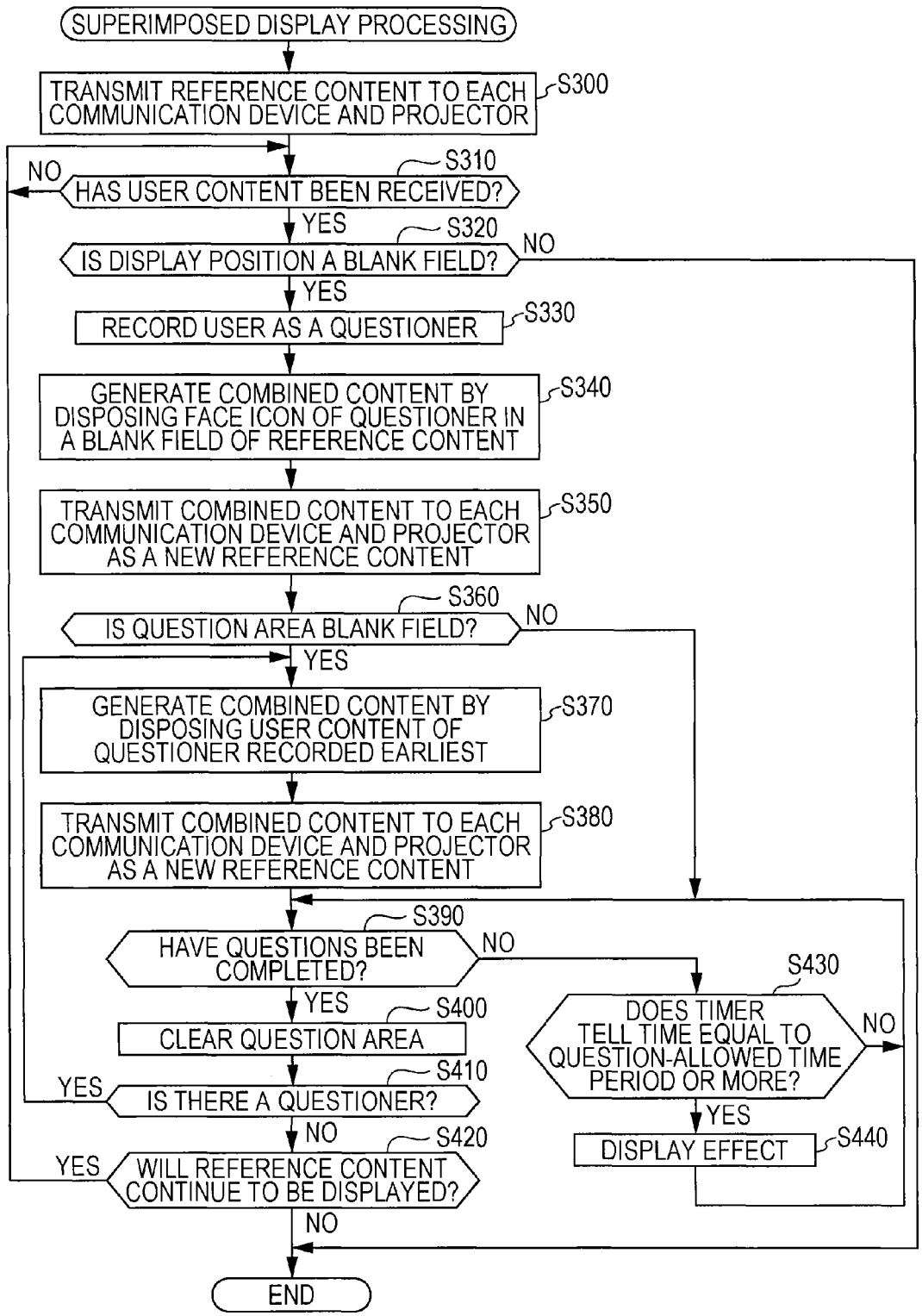
FIG. 22 is a flowchart illustrating a processing procedure by the information processing system.

In this regard, the information processing system 5 may perform superimposed display processing illustrated in FIG. 22 together with or in place of the above-described processing. In the following, a description will be given of the superimposed display processing illustrated in FIG. 22. In step S300, the control section 13 of the server 10 obtains a reference content from the storage section 12, and outputs the reference content to the content acquisition section 11. The control section 13 outputs, for example, the reference content illustrated in FIG. 23 to the content acquisition section 11. The reference content illustrated in FIG. 23 includes a question-contents display area 150, questioner-icon display areas 151, and a timer area 152. In the question-contents display area 150, questions by questioners are displayed. The questioner-icon display areas 151 can be in a reservation state in which a face icon image of a questioner is displayed and a blank field state in which a blank-field image is displayed. In the example illustrated in FIG. 23, all the questioner-icon display areas 151 are in blank field states. The timer area 152 starts operation when any one of the questioners asks a question. Accordingly, this reference content is displayed when a user asks a presenter a question. In the following, a description will be given of processing using this example. In this regard, the number of the questioner-icon display areas 151 is not limited to 5.

The content acquisition section 11 transmits the reference content to each of the communication devices 20 and the projector 50. The communication section 24 of each of the communication devices 20 receives the reference content, and transmits the reference content to the control section 25. The control section 25 displays the reference content and the image content stored in the storage section 23 onto the presentation section 22. The projector 50 displays the reference content on the screen 51.

The user specifies a questioner-icon display area 151 in a blank-field state, and inputs question contents in the area. A specific method of operation is the same as that of the first embodiment. The control section 25 determines a question sentence content describing question contents and a face icon image to be a user content, and outputs the user content and position information indicating the user-specified position to the communication section 24. The communication section 24 transmits superimposed-display request information including the information to the server 10. The content acquisition section 11 of the server 10 receives the superimposed-display request information, and outputs the information to the control section 13.

In step S310, the control section 13 waits until a user content, that is to say, superimposed-display request information is given. If superimposed-display request information is given, the control section 13 proceeds to step S320.

In step S320, the control section 13 determines whether a condition of the user specifying a questioner-icon display area 151 in a blank field state is met or not. If determined that this condition is met, the control section 13 proceeds to step S330, whereas if determined that this condition is not met, the superimposed display processing is terminated.

In step S330, the control section 13 records the user as a questioner. In step S340, the control section 13 superimposes the face icon image on the questioner-icon display area 151 at the user-specified position so as to generate a combined content. Accordingly, the face icon image becomes the superimposed display content. Thereby, the questioner-icon display area 151 at the user-specified position goes into a reserved state.

In step S350, the control section 13 determines the combined content to be a new reference content, and outputs the new reference content to the content acquisition section 11 to store the new reference content into the storage section 12. The content acquisition section 11 transmits the reference content to each of the communication devices 20 and the projector 50. The communication section 24 of each of the communication devices 20 receives the reference content, and transmits the reference content to the control section 25. The control section 25 replaces the reference content in display by the reference content given from the communication section 24. In the same manner, the projector 50 replaces the reference content in display on the screen 51 by the newly received reference content.

A display example is illustrated in FIG. 24. In this example, up to three questioner-icon display areas 151 from the left are in a reserved state. That is to say, face icon images 202, 242, and 232 of the users A, E, and D are superimposed on the three questioner-icon display areas 151 from the left, respectively. In step S360, the control section 13 determines whether a condition that the question-contents display area 150 is a blank field is met or not. If determined that this condition is met, the control section 13 proceeds to step S370, whereas if determined that this condition is not met, the control section 13 proceeds to step S390.

In step S370, the control section 13 superimposes a user content of the questioner who was recorded earliest, that is to say, a question sentence content on the question-contents display area 150, and highlights the face icon image of the questioner so as to generate a combined content. Accordingly, the question sentence content and the face icon image become the superimposed display content.

In step S380, the control section 13 determines the combined content to be a new reference content, and outputs the new reference content to the content acquisition section 11 to store the reference content into the storage section 12. The content acquisition section 11 transmits the reference content to each of the communication devices 20 and the projector 50. The communication section 24 of each of the communication devices 20 receives the reference content, and transmits the reference content to the control section 25. The control section 25 replaces the reference content in display by the reference content given from the communication section 24. In the same manner, the projector 50 replaces the reference content in display on the screen 51 by the newly received reference content. A display example is illustrated in FIG. 25. In this example, the user A is asking a question.

In this regard, the control section 13 starts operation of the timer area 152, and outputs the timer area 152 to the content acquisition section 11 when necessary. The content acquisition section 11 transmits the timer area 152 to each of the communication devices 20 and the projector 50. The communication section 24 of each of the communication devices 20 receives the timer area 152, and transmits the timer area 152 to the control section 25. The control section 25 replaces the timer area 152 in display by the timer area 152 given by the communication section 24. In the same manner, the projector 50 replaces the timer area 152 in display on the screen 51 by the newly received timer area 152.

In step S390, the control section 13 determines whether questions have been terminated or not. If determined that the questions have been terminated, the control section 13 proceeds to step S400, whereas if determined that the questions have not been terminated, the control section 13 proceeds to step S430.

In step S400, the control section 13 changes the question-contents display area 150 to a blank field to generate a new reference content. The control section 13 outputs the reference content to the content acquisition section 11 to stores the reference content into the storage section 12. The content acquisition section 11 transmits the reference content to each of the communication devices 20 and the projector 50. The communication section 24 of each of the communication devices 20 receives the reference content, and transmits the reference content to the control section 25. The control section 25 replaces the reference content in display by the reference content given from the communication section 24. In the same manner, the projector 50 replaces the reference content in display on the screen 51 by the newly received reference content.

In step S410, the control section 13 determines whether a condition in which there is a questioner who has not ask a question yet is met or not. If determined that this condition is met, the control section 13 returns to step S370, whereas if determined that this condition is not met, the control section 13 proceeds to step S420.

In step S420, the control section 13 determines whether or not to continue to display the reference content. If determined to continue to display the reference content, the control section 13 returns to step S310, whereas if determined to terminate to display the reference content, the superimposed display processing is terminated.

In step S430, the control section 13 determines whether a condition in which the timer area 152 tell a time of a predetermined-question-allowed time period or more is met or not. If determined that this condition is met, the control section 13 proceeds to step 5440, whereas if determined that this condition is not met, the control section 13 returns to step S390.

In step S440, the control section 13 performs effect display processing. For example, the control section 13 generates a reference content in which a face-icon image of a questioner who has not asked a question yet trembles. The control section 13 outputs the reference content to the content acquisition section 11, and stores the reference content to the storage section 12. The content acquisition section 11 transmits the reference content to each of the communication devices 20 and the projector 50. The communication section 24 of each of the communication devices 20 receives the reference content, and transmits the reference content to the control section 25. The control section 25 replaces the reference content in display by the reference content given from the communication section 24. In the same manner, the projector 50 replaces the reference content in display on the screen 51 by the newly received reference content. Thereby, each of the users can recognize that questions have been taking a long time. Also, the information processing system 5 can prompt the questioners to terminate questions.

By the superimposed display processing illustrated in FIG. 22, the information processing system 5 can easily inform each of the users of the questioner and the question contents. Also, by counting the number of the questioner-icon display areas 151 that are in a blank field state, the users can grasp the number remaining persons allowed to ask questions.

In the above, detailed descriptions have been given of preferred embodiments of the present disclosure with reference to the accompanying drawings. However, the present disclosure is not limited to such examples. It should be understood by those skilled in the art to which the present disclosure pertains that various changes and modifications may apparently occur within the spirit and scope of the appended claims, and such changes and modifications may naturally fall within the spirit and scope of the present disclosure.

For example, the above-described first to fifth embodiments may be suitably combined. For example, in place of the reference content 101 illustrated in FIG. 5, the reference content illustrated in FIG. 11 may be displayed. In this case, in the information processing system, various image contents may be superimposed on the reference content illustrated in FIG. 11. Also, an image content for use in voting, to which the user has voted, may be determined on the basis of a position of a superimposed image content and a position of the image content for use in voting. Also, in the information processing system, the reference content illustrated in FIG. 11 may be displayed on the display 130 illustrated in FIG. 14. In this case, the viewers X can view a state of voting. Also, in the information processing system, any image content may be superimposed on the show window 43 illustrated in FIG. 16. Also, in the information processing system, any image content may be superimposed on the reference content 140 illustrated in FIG. 21.

The following embodiments are also consistent with the present disclosure.

(1) An information processing apparatus comprising: a processor that controls a user interface to display content; acquires position information corresponding to an input received at the user interface; determines a condition corresponding to the position information; and controls the user interface to display data corresponding to the input based on a result of the determining.

(2) The information processing apparatus of (1), further comprising: a communication interface, wherein the processor controls the user interface to display the content by transmitting the content to another information processing apparatus including the user interface.

(3) The information processing apparatus of any one of (1) or (2), further comprising: a communication interface, wherein the processor controls a plurality of user interfaces to display the content by transmitting the content to a plurality of other information processing apparatuses each including a user interface.

(4) The information processing apparatus of any one of (1) to (3), further comprising: a communication interface, wherein the processor acquires the position information corresponding to the input received at the user interface by receiving, via the communication interface, the position information from another information processing apparatus including the user interface.

(5) The information processing apparatus of any one of (1) to (4), further comprising: a communication interface, wherein the processor acquires a plurality of position information corresponding to a plurality of inputs received at each of a plurality of user interfaces by receiving, via the communication interface, the plurality of position information from a plurality of other information processing apparatuses each including one of the plurality of user interfaces.

(6) The information processing apparatus of any one of (1) to (5), further comprising: a memory that stores the content, wherein the processor controls the user interface to display the content by acquiring the content from the memory.

(7) The information processing apparatus of any one of (1) to (6), wherein the input received at the user interface corresponds to a request to superimpose text or image data on the displayed content.

(8) The information processing apparatus of (7), wherein the processor determines, as the condition, whether the position information corresponding to the request indicates that request was input at a position corresponding to the displayed content.

(9) The information processing apparatus of (8), wherein the processor controls the user interface to display the text or image data superimposed on the displayed content when it is determined that the request was input at a position corresponding to the displayed content.

(10) The information processing apparatus of (8), wherein the processor determines whether a number of existing text or image data superimposed on the displayed content exceeds a predetermined threshold value.

(11) The information processing apparatus of (10), wherein the processor deletes an oldest text or image data from the existing text or image data when the number of existing text or image data exceeds the predetermined threshold value, and the processor controls the user interface to display the text or image data corresponding to the request together with the existing text or image data when it is determined that the request was input at a position corresponding to the displayed content.

(12) The information processing apparatus of any one of (10) or (11), wherein the processor controls the user interface to display the text or image data corresponding to the request together with the existing text or image data when the number of existing text or image data does not exceed the predetermined threshold value and the request was input at a position corresponding to the displayed content.

(13) The information processing apparatus of any one of (1) to (12), wherein the displayed content is a moving image, the processor performs motion detection processing on the moving image to extract a motion object, the processor determines, as the condition, whether the position information corresponding to the request indicates that request was input at a position corresponding to the motion object, and the processor controls the user interface to display data corresponding to the input so that the display data moves in correspondence with the motion object based on a result of the determining.

(14) The information processing apparatus of any one of (1) to (13), wherein the displayed data corresponding to the input includes at least one of text data, image data, photo data, moving image content, and a link to a Website.

(15) The information processing apparatus of any one of (1) to (14), wherein
the displayed content includes a plurality of image contents and a plurality of areas that each correspond to one of the plurality of image contents.

(16) The information processing apparatus of (15), wherein the processor determines, as the condition, whether the position information corresponding to the input indicates that the input was received at a position corresponding to one of the plurality of image contents.

(17) The information processing apparatus of (16), wherein the processor controls the user interface to modify data displayed in one of the plurality of areas based on a result of the determining.

(18) The information processing apparatus of (17), wherein the plurality of areas that each correspond to one of the plurality of image contents are counters, and the processor controls the user interface to update a number displayed in one of the plurality of counters based on the determining.

(19) An information processing method performed by an information processing apparatus, the method comprising: controlling a user interface to display content; acquiring position information corresponding to an input received at the user interface; determining a condition corresponding to the position information; and controlling the user interface to display data corresponding to the input based on a result of the determining.

(20) A non-transitory computer-readable medium including computer program instructions, which when executed by an information processing apparatus, cause the information processing apparatus to perform a method comprising: controlling a user interface to display content; acquiring position information corresponding to an input received at the user interface; determining a condition corresponding to the position information; and controlling the user interface to display data corresponding to the input based on a result of the determining.

What is claimed is:

1. An information processing apparatus comprising:
   one or more processors configured to:
   control a user interface to display content;
   acquire position information corresponding to a user input received at the user interface, the user input corresponding to a request to superimpose text or image data on the displayed content;
   determine whether the position information corresponding to the request indicates that the request was input at a position corresponding to the displayed content;
   identify whether a number of existing text or image data superimposed on the displayed content exceeds a predetermined threshold value;
   control the user interface to display the superimposed text or image data corresponding to the request together with the existing text or image data when the number of existing text or image data does not exceed the predetermined threshold value and the request was input at the position corresponding to the displayed content,
   analyze the existing text or image data superimposed on the displayed content in a pre-determined area to grasp content common to a portion of the existing text or image data when the number of existing text or image data exceeds the predetermined threshold value and the request was input at the position corresponding to the displayed content, and
   generate another superimposed text or image data including at least the content common to the portion of the existing text or image data in the pre-determined area based on a result of the analysis,
   wherein the superimposed text or image data moves to follow a motion object in the display content.

2. The information processing apparatus of claim 1, further comprising:
   a communication interface, wherein the one or more processors are configured to control the user interface to display the content by transmitting the content to another information processing apparatus including the user interface.

3. The information processing apparatus of claim 1, further comprising:
   a communication interface, wherein the one or more processors are configured to control a plurality of user interfaces to display the content by transmitting the content to a plurality of other information processing apparatuses each including a user interface.

4. The information processing apparatus of claim 1, further comprising:
   a communication interface, wherein the one or more processors are configured to acquire the position information corresponding to the input received at the user interface by receiving, via the communication interface, the position information from another information processing apparatus including the user interface.

5. The information processing apparatus of claim 1, further comprising:
   a communication interface, wherein the one or more processors are configured to acquire a plurality of position information corresponding to a plurality of inputs received at each of a plurality of user interfaces by receiving, via the communication interface, the plurality of position information from a plurality of other information processing apparatuses each including one of the plurality of user interfaces.

6. The information processing apparatus of claim 1, further comprising:
a memory that stores the content, wherein the one or more processors are configured to control the user interface to display the content by acquiring the content from the memory.

7. The information processing apparatus of claim 1, wherein the one or more processors are configured to:
delete an oldest text or image data from the existing text or image data when the number of existing text or image data exceeds the predetermined threshold value, and
control the user interface to display the text or image data corresponding to the request together with the existing text or image data when it is determined that the request was input at a position corresponding to the displayed content.

8. The information processing apparatus of claim 1, wherein the displayed data corresponding to the input includes at least one of text data, image data, photo data, moving image content, and a link to a Website.

9. The information processing apparatus of claim 1, wherein the displayed content includes a plurality of image contents and a plurality of areas that each correspond to one of the plurality of image contents.

10. An information processing method performed by an information processing apparatus, the method comprising:
controlling a user interface to display content;
acquiring position information corresponding to an input received at the user interface, the user input corresponding to a request to superimpose text or image data on the displayed content;
determining whether the position information corresponding to the request indicates that the request was input at a position corresponding to the displayed content;
identifying whether a number of existing text or image data superimposed on the displayed content exceeds a predetermined threshold value;
controlling the user interface to display the superimposed text or image data corresponding to the request together with the existing text or image data when the number of existing text or image data does not exceed the predetermined threshold value and the request was input at the position corresponding to the displayed content;
analyzing the existing text or image data superimposed on the displayed content in a pre-determined area to grasp content common to a portion of the existing text or image data when the number of existing text or image data exceeds the predetermined threshold value and the request was input at the position corresponding to the displayed content; and
generate another superimposed text or image data including at least the content common to the portion of to existing text or image data in the pre-determined area based on a result of the analysis,
wherein the superimposed text image data moves to follow a motion object in the displayed content.

11. A non-transitory computer-readable medium including computer program instructions, which when executed by an information processing apparatus, cause the information processing apparatus to perform a method comprising:
controlling a user interface to display content;
acquiring position information corresponding to an input received at the user interface, the user input corresponding to a request to superimpose text or image data on the displayed content;
determining whether the position information corresponding to the request indicates that the request was input at a position corresponding to the displayed content;
identifying whether number of existing text or image data superimposed on the displayed content exceeds a predetermined threshold value;
controlling the user interface to display the superimposed text or image data corresponding to the request together with the existing text or image data when the number of existing text or image data does not exceed the predetermined threshold value and the request was input at the position corresponding to the displayed content;
analyzing the existing text or image data superimposed on the displayed content in a pre-determined area to grasp content common to a portion of the existing text or image data when the number of existing text or image data exceeds the predetermined threshold value and the request was input at the position corresponding to the displayed content; and
generate another superimposed text or image data including at least the content common to the portion of the existing text or image data in the pre-determined area based on a result of the analysis,
wherein the superimposed text or image data moves to follow a motion object in the displayed content.

12. The information processing apparatus of claim 1, wherein the one or more processors are configured to control the user interface not to display the superimposed text or image data corresponding to the request together with the existing text or image data when the number of existing text or image data exceeds the predetermined threshold value and the request was input at the position corresponding to the displayed content.

13. The information processing method of claim 10, further comprising:
controlling the user interface not to display the superimposed text or image data corresponding to the request together with the existing text or image data when the number of existing text or image data exceeds the predetermined threshold value and the request was input at the position corresponding to the display content.

14. The non-transitory computer-readable medium of claim 11, the method further comprising:
controlling the user interface not to display the superimposed text or image data corresponding to the request together with the existing text or image data when the number of existing text or image data exceeds the predetermined threshold value and the request was input at the position corresponding to the displayed content.

15. The information processing apparatus of claim 1, wherein the one or more processors are further configured to:
calculate a value that correspond to an arithmetic means of a plurality of position information corresponding to the existing text or image data in the pre-determined area; and
determine the calculated value as a user-specified position of the generated other superimposed text or image data.

* * * * *